United States Patent
Kawahito et al.

(10) Patent No.: US 8,689,198 B2
(45) Date of Patent: Apr. 1, 2014

(54) COMPILING SYSTEM AND METHOD FOR OPTIMIZING BINARY CODE

(75) Inventors: Motohiro Kawahito, Kanagawa-ken (JP); Ali I. Sheikh, Ontario (CA); Vijay Sundaresan, Ontario (CA)

(73) Assignee: International Business Machines Corporation, Armonk, NY (US)

( * ) Notice: Subject to any disclaimer, the term of this patent is extended or adjusted under 35 U.S.C. 154(b) by 230 days.

(21) Appl. No.: 13/206,781

(22) Filed: Aug. 10, 2011

(65) Prior Publication Data
US 2012/0042306 A1    Feb. 16, 2012

(30) Foreign Application Priority Data

Aug. 11, 2010   (JP) .................................. 2010-180043

(51) Int. Cl.
*G06F 9/45*         (2006.01)
(52) U.S. Cl.
USPC .......................................................... 717/151
(58) Field of Classification Search
None
See application file for complete search history.

(56) References Cited

U.S. PATENT DOCUMENTS

| | | | |
|---|---|---|---|
| 6,223,340 B1 * | 4/2001 | Detlefs ......................... | 717/145 |
| 7,085,914 B1 | 8/2006 | Gschwind | |
| 8,127,280 B2 * | 2/2012 | Thomas et al. ............... | 717/140 |
| 2008/0016507 A1 * | 1/2008 | Thomas et al. ............... | 718/100 |
| 2012/0030659 A1 * | 2/2012 | Porras et al. .................. | 717/151 |

OTHER PUBLICATIONS

Collins, Ryan, Fernando Alegre, Xiaotong Zhuang, and Santosh Pande. "Compiler Assisted Dynamic Management of Registers for Network Processors," 2006, IEEE 20th International Parallel and Distributed Processing Symposium (IPDPS). pp. 1-10. Retrieved from IEEExplore on May 11, 2013.*

Jacobs, Joshua, "Improving Memory Performance through Runtime Optimization," ME thesis. Massachusetts Institute of Technology. Cambridge, MA, May 2002. Print.

* cited by examiner

*Primary Examiner* — Don Wong
*Assistant Examiner* — Erika Kretzmer
(74) *Attorney, Agent, or Firm* — Cantor Colburn LLP

(57) ABSTRACT

A compiling system and method for optimizing binary code. The method includes the step of replacing a memory access on a stack area in order to save a value of a register with local variable access. The method further includes: giving a call number to a call instruction and an inlined code in response to an inline expansion of a code to be called by the call instruction; creating a parent-child relationship information for at least one of the call number; processing the memory accesses with an escaped stack pointer as a base address if a stack pointer has escaped; prohibiting a replacement of a prohibited memory access if the stack pointer has escaped; and replacing unprohibited memory access with the local variable access if the stack pointer has escaped.

18 Claims, 24 Drawing Sheets

BINARY CODE

Input: R15=Stack Pointer, R14=Return Address

```
1001
01    STM    R12,R15,0x30 (R15)    (SP off: 0) // R15 escapes.
02    AHI    R15, 0xffa0                        (SP off: -96)
03    LARL   R12, 0x914
04    LR     R2, R4
05    LR     R3, R5
06    R14  = addr of Label1
07    STM    R12, R15,0x30 (R15)   (SP off: -96)
08    AHI    R15, 0xffa0                        (SP off: -192)
09    LARL   R12, 0x924
10    BRASL  R14, 0xffffff63
11    LARL   R1, 0x956
12    LHI    R4, 0xa
13    LHI    R5, 0x0
14    SRDA   R4, R0, 0x20 (R0)
15    D      R4, 0x0 (R0, R1)
16    LR     R4, R5
17    LR     R1, R3
18    CHI    R3, 0x1
19    BRC    0xa, 0x4
20    LHI    R1, 0x1
21    AR     R2, R4
22    BRCT   R1, 0xffff
23    BCR    0xf, R14
24    L      R4, 0x98 (R0, R15)    (SP off:-192)
25    LM     R12, R15, 0x90 (R15)  (SP off: -192) -> -96 // R15 is loaded.
26    BCR    0xf, R4 -indirect branch. What is the value of R4?
      Label1:
27    L      R4, 0x98 (R0, R15)    (SP off:-96)
28    LM     R12, R15, 0x90 (R15)  (SP off: -96) -> 0 // R15 is loaded.
29    BCR    0xf, R4 -indirect branch. What is the value of R4?
```

AFTER OPTIMIZATION

```
1002
101   L1 = R12
102   L2 = R13
103   L3 = R14    -(b)
104   L4 = R15
105   LARL   R12, 0x914
106   LR     R2, R4
107   LR     R3, R5
108   R14 = addr of Label1 - (a)
109   L5 = R12
110   L6 = R13
111   L7 = R14
112   L8 = R15
113   LARL   R12, 0x924
114   BRASL  R14, 0xffffff63
115   LARL   R1, 0x956
116   LHI    R4, 0xa
117   LHI    R5, 0x0
118   SRDA   R4, R0, 0x20 (R0)
119   D      R4, 0x0 (R0,R1)
120   LR     R4, R5
121   LR     R1, R3
122   CHI    R3, 0x1
123   BRC    0xa, 0x4
124   LHI    R1, 0x1
125   AR     R2, R4
126   BRCT   R1, 0xffff
127   BCR    0xf, R14
128   R4 = L7
129   R12 = L5
130   R13 = L6
131   R14 = L7
132   R15 = L8
133   BCR 0xf, R4 -R4 is originally defined at (a)
      Label1:
134   R4 = L3
135   R12 = L1
136   R13 = L2
137   R14 = L3
138   R15 = L4
139   BCR 0xf, R4 - R4 is originally defined ar (b)
```

FIG. 10

COMPILING SYSTEM AND METHOD FOR OPTIMIZING BINARY CODE

CROSS-REFERENCE TO RELATED APPLICATION

This application claims priority under 35 U.S.C. §119 from Japanese Patent Application No. 2010-180043 filed Aug. 11, 2010, the entire contents of which are incorporated herein by reference.

BACKGROUND OF THE INVENTION

1. Field of the Invention

The Present Invention relates to computer technology. More particularly, the Present Invention is related a compiling method for optimizing binary code.

2. Description of Related Art

A binary code often includes save instructions and restore instructions to registers. Examples of such instructions include STM (store multiple) and LM (load multiple), which are assembler mnemonics of the z/Architecture of IBM (registered trademark). In the binary code, a large number of memory accesses are generated to store registers on a stack and to restore the registers. For this reason, to improve the performance of the computer resources, the memory accesses are replaced with register accesses to increase processing speed.

A method for renaming stack references in a computer processing system is described in U.S. Pat. No. 7,085,914 (the fourth column, lines 17 to 20). U.S. Pat. No. 7,085,914 includes the steps of detecting stack references that use architecturally defined stack access methods, and replacing the stack references with references to processor-internal registers (the fourth column, lines 21 to 27). U.S. Pat. No. 7,085,914 further includes the step of synchronizing an architected state between the processor-internal registers and a main memory of the computer processing system (the fourth column, lines 28 to 31). The method described in U.S. Pat. No. 7,085,914, however, is a new hardware mechanism to be incorporated in a computer system and is to modify processing that is performed during the execution of an instruction.

JACOBS, JOSHUA. "Improving Memory Performance through Runtime Optimization." ME thesis. Massachusetts Institute of Technology, Cambridge, Mass., 2002. Print. describes a redundant load removal (RLR) optimization analysis (pages 23 to 28, Chapter 4 "Redundant load removal on traces"). In JACOBS, however, no optimization (removal or the like) for store instructions is performed.

SUMMARY OF THE INVENTION

Accordingly, one aspect of the present invention provides a method for optimizing binary code including memory accesses, the method including the step of replacing a memory access on a stack area in order to save a value of a register with local variable access.

Another aspect of the present invention provides a system for optimizing binary code including memory accesses, the system including a first replacement module for replacing a memory access on a stack area in order to save a value of a register with local variable access.

BRIEF DESCRIPTION OF THE DRAWINGS

FIG. 10 shows conversion target binary code, and code generated after an optimization of an embodiment of the present invention is applied to the binary code.

DETAILED DESCRIPTION OF THE PREFERRED EMBODIMENTS

Figure 1:
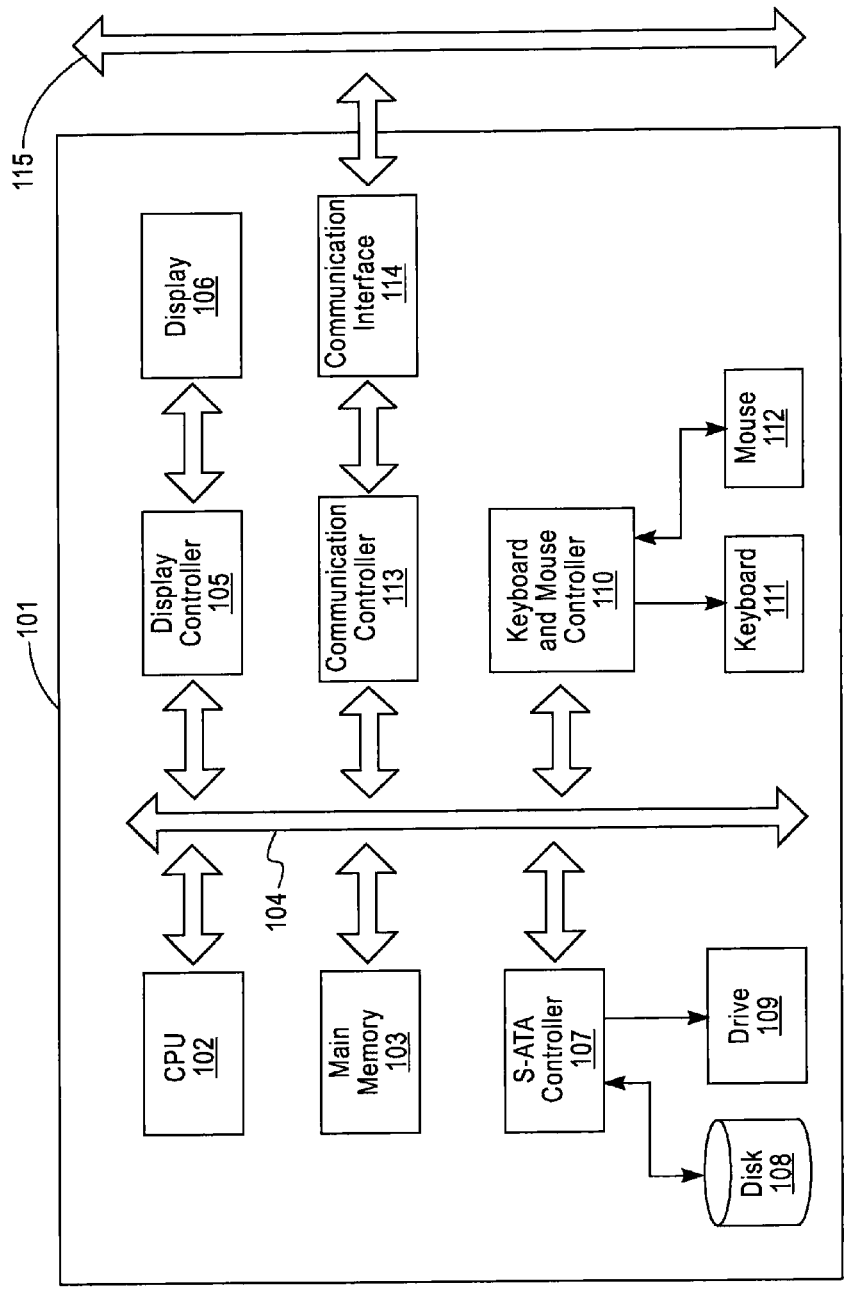
FIG. 1 shows a basic block diagram of computer hardware in embodiments of the present invention.

The above and other features of the present invention will become more distinct by a detailed description of embodiments shown in combination with attached drawings. Identical reference numbers represent the same or similar parts in the attached drawings of the invention.

As will be appreciated by one skilled in the art, aspects of the present invention can be embodied as a system, method or computer program product. Accordingly, aspects of the present invention can take the form of an entirely hardware embodiment, an entirely software embodiment (including firmware, resident software, micro-code, etc.) or an embodiment combining software and hardware aspects that can all generally be referred to herein as a "circuit," "module" or "system." Furthermore, aspects of the present invention can take the form of a computer program product embodied in one or more computer readable medium(s) having computer readable program code embodied thereon.

Any combination of one or more computer readable medium(s) can be utilized. A computer readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium can be any tangible medium that can contain, or store a program for use by or in connection with an instruction execution system, apparatus, or device.

Computer program code for carrying out operations for aspects of the present invention can be written in any combination of one or more programming languages, including an object oriented programming language such as Java, Smalltalk, C++ or the like and conventional procedural programming languages, such as the "C" programming language or similar programming languages. The program code can execute entirely on the user's computer, partly on the user's computer, as a stand-alone software package, partly on the user's computer. Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions can also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams can represent a module, segment, or portion of code, which includes one or more executable instructions for implementing the specified logical function(s). It should also be noted that, in some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

In order to improve performance of computer resources, there is a demand to develop a new technique that achieves faster processing by replacing memory accesses with register accesses. However, many clients either do not want to or cannot re-compile the existing binary code that represents the source code. Furthermore, there is a demand for a technique that effectively optimizes both store instructions and load instructions, even when a complier inlines a code to be called by call instructions in the binary code in a nested manner.

A stack area, by its nature, is only accessed by a thread that is originally associated with the stack area. Therefore, the inventors of the present invention have made efforts to optimize binary codes by focusing on the stack area.

First, limiting an optimization using escape analysis is caused mainly by save instructions and restore instructions for stack pointers. These save instructions and restore instructions are not actually aliased. These findings are important for optimizing binary code. The present invention has been made on the basis of these findings. More specifically, the present invention can reduce the number of escape instructions by initially optimizing the save instructions and restore instructions.

The present invention provides a compiling method for optimizing binary code including memory accesses. The method can be executed by a computer and particularly by a compiler system. This method performs an optimization of a memory access to a stack area in order to save a value of each register, e.g., a register save area, from among the aforementioned memory accesses. In addition, the method further performs a memory access optimization on an area other than the stack area, in order to save a value of each register that is from the memory accesses. The method can use call numbers that are given to the call instructions and the inlined code, in response to an inline expansion of code to be called by a call instruction included in binary code.

In addition, the present invention provides a computer program causing a computer and particularly a compiler system to execute the aforementioned compiling method.

The present invention provides a computer focusing on the stack area and particularly a compiler system for optimizing binary code including memory accesses.

With the compiling method for the present invention, the number of instructions that causes escape can be reduced by optimizing memory accesses to a stack area where a value of each register can be saved.

In addition, with the compiling method for the present invention, both store instruction and load instruction can be effectively optimized, even when a code is inline-expanded into a nested manner. The compiling method for the present invention is useful particularly if a code to be called by a bytecode call instruction is inlined.

In the embodiments of the present invention, binary code (FIG. 2, 211) is the optimization target code.

In the embodiments of the present invention, the binary code (FIG. 2, 211) includes memory accesses. In the embodiments of the present invention, stack accesses, i.e., the memory accesses are classified into two categories. To put it more specifically, the memory accesses are classified into memory accesses to a stack area in order to save a value of each register, e.g., to a register save area, and memory accesses other than these memory accesses.

The memory accesses other than the memory accesses to a register save area are as follows.

(1) A memory access via a stack pointer that has not escaped.

(2) If a stack pointer has escaped, from among the memory accesses using the escaped stack pointer as their base address, (i) a memory access belonging to a call number given to an instruction that has caused the escape and a root call number of the call number and (ii) a memory access other than (i). The call number is a number to be given, in accordance with the occurrence of an event that code to be called by call instructions included in binary code is inlined, to each of the call instructions and the inlined code. The call numbers follow parent-child relationship information indicating that the call number of the caller of the call instruction is a parent whereas the call number of the callee of the call instruction is a child.

In the present invention, it is preferable to first perform an optimization of a memory access to a stack area in order to save a value of each register among the memory accesses classified into the aforementioned two categories (case (A) below). It is preferable to thereafter perform an optimization of a memory access other than the aforementioned memory access (case (B) or (C) below).

In the embodiments of the present invention, there are three forms (A) to (C) below in each of which a memory access is replaced with a local variable access.

(A) A memory access to a stack area in order to save a value of each register is replaced with a local variable access. In this form, all the memory accesses are replaced with local variable accesses regardless of whether their stack pointers have escaped or not.

(B) Under the condition that the stack pointer has not escaped, the memory access described in (1) is replaced with a local variable access.

(C) If the stack pointer has escaped, replacement of the memory access described in (2)(i) with a local variable access is prohibited. Meanwhile, the memory access described in (2)(ii) is replaced with a local variable access.

The first embodiment of the present invention corresponds to (A) described above and is illustrated in FIGS. 4A to 4D.

The second embodiment of the present invention corresponds to a combination of (A) and (B) described above and is illustrated in FIGS. 5A to 5D.

Figure 6A:
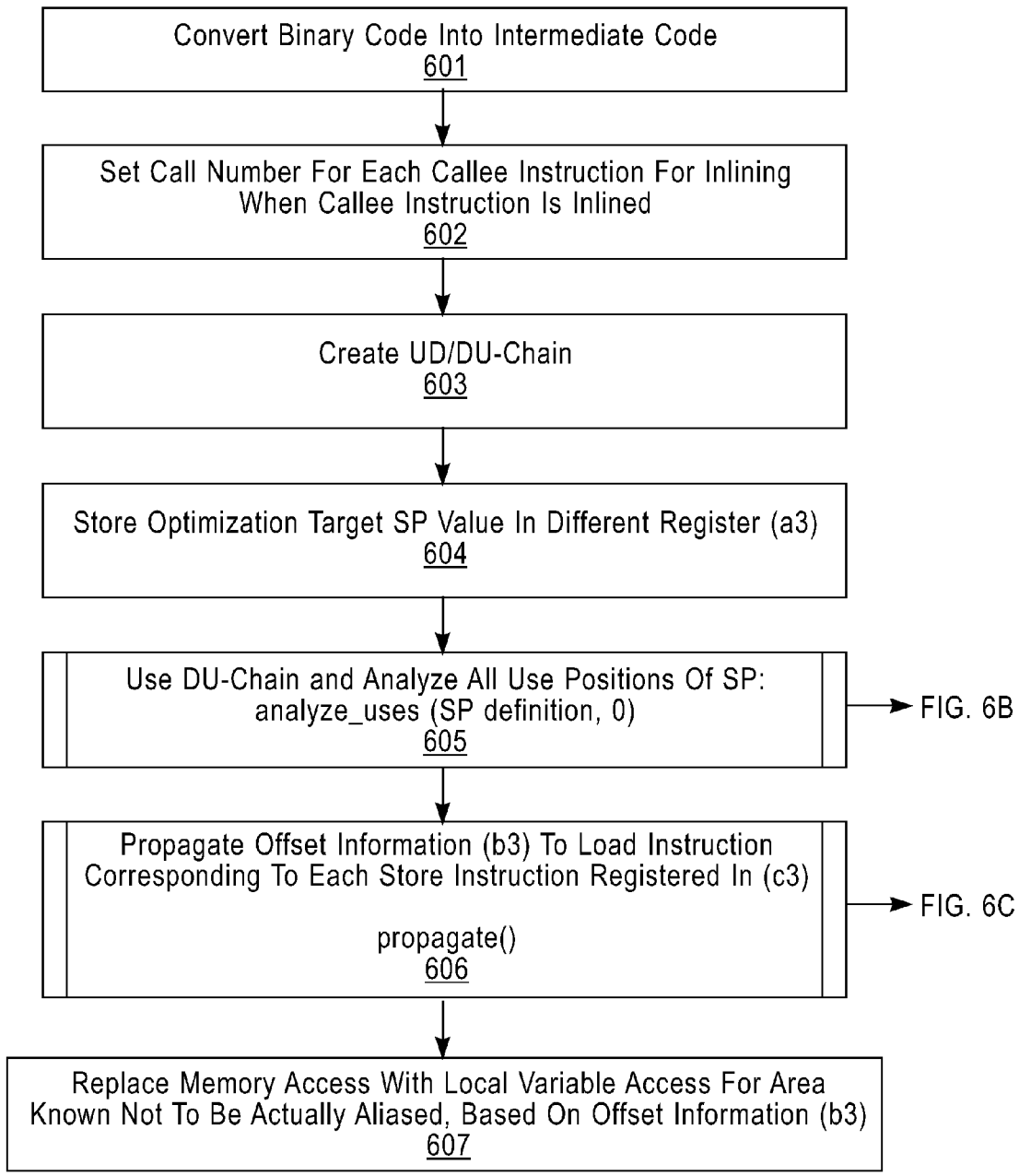
FIG. 6A shows a flowchart of a compiling method for optimizing binary code, which corresponds to a third embodiment of the present invention.
Figure 6B:
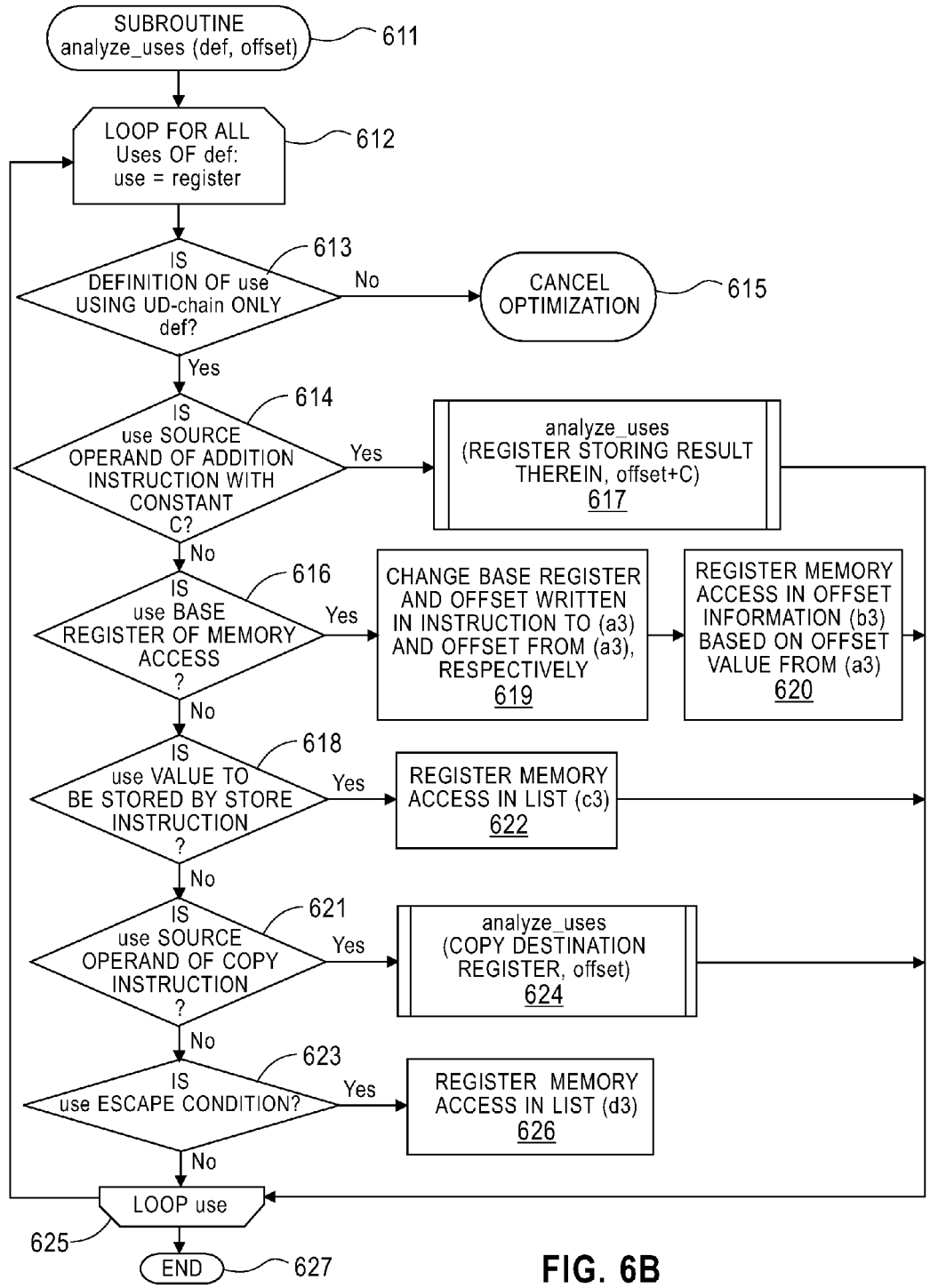
FIG. 6B shows an embodiment of a subroutine analyze_uses(def, offset) of step 605 of FIG. 6A.
Figure 6C:
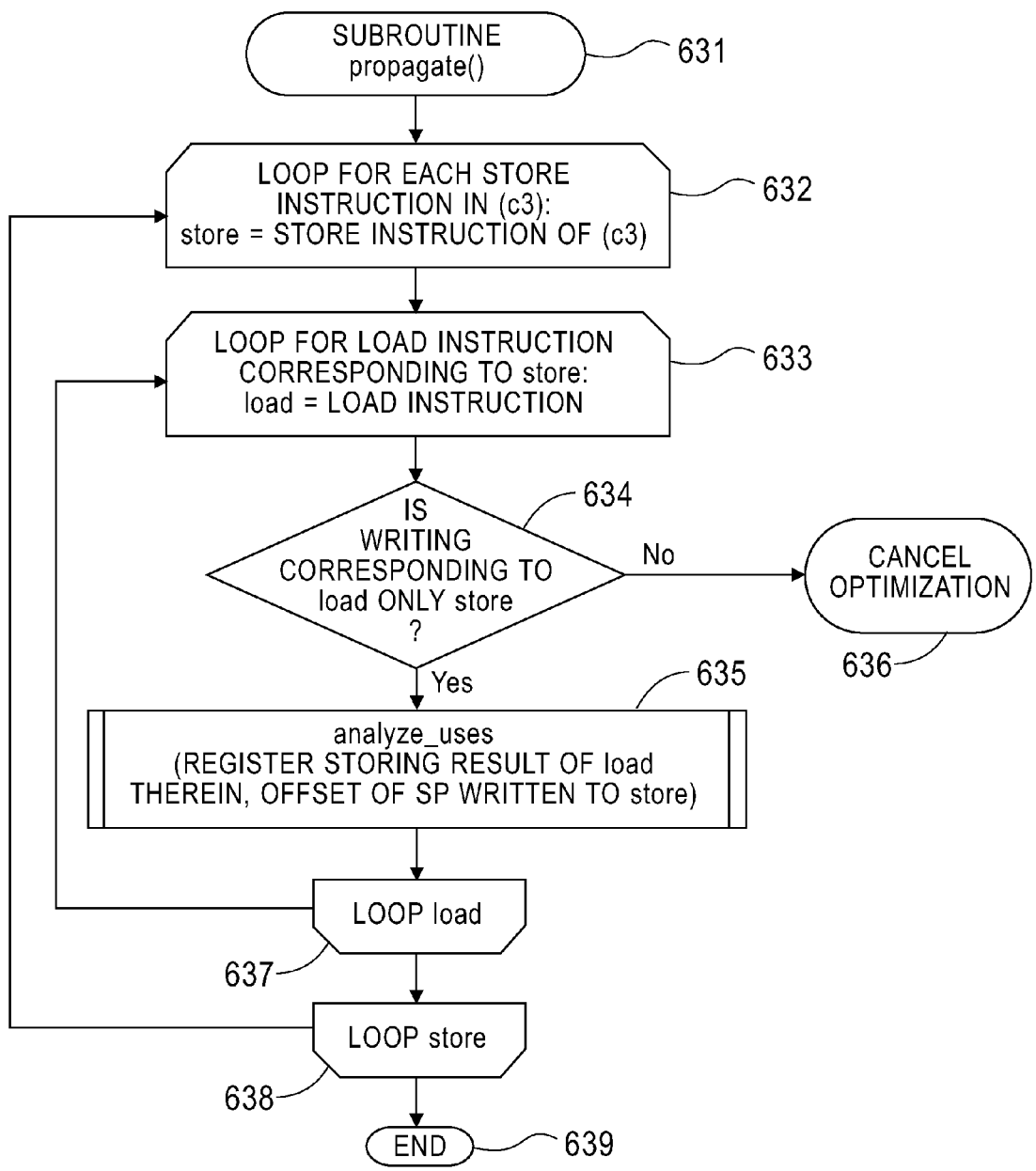
FIG. 6C shows an embodiment of a subroutine propagate( ) of step 606 of FIG. 6A.

The third embodiment of the present invention corresponds to a combination of (A) described above and the condition that a call number is given to a call instruction, and is illustrated in FIGS. 6A to 6C.

The fourth embodiment of the present invention corresponds to a combination of (A) and (C) described above as well as the condition that a call number is given to a call instruction, and is illustrated in FIGS. 7A to 7E.

Figure 4A:
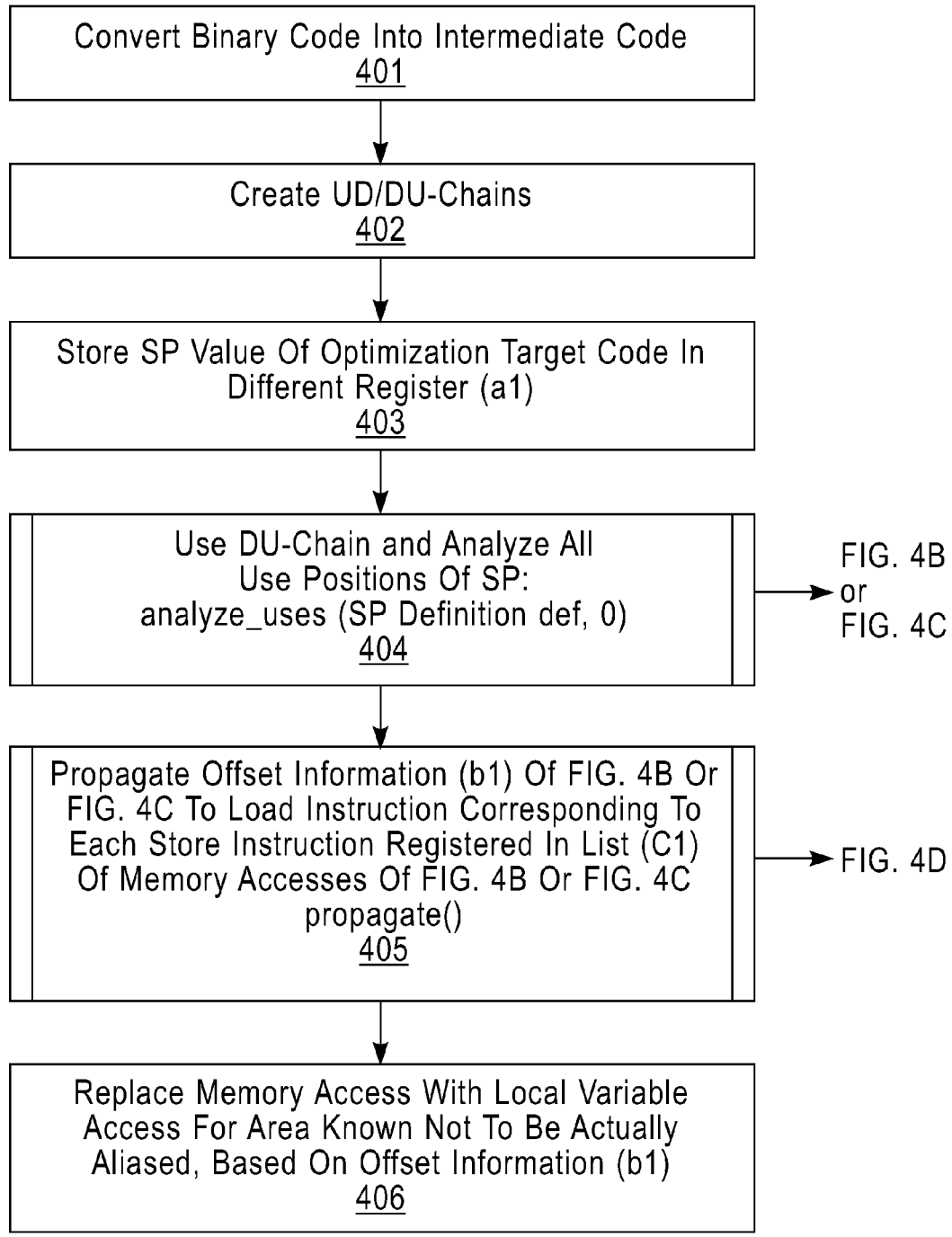
FIG. 4A shows a flowchart of a compiling method for optimizing binary code, which corresponds to a first embodiment of the present invention.

In a method for one aspect of the present invention, a computer (FIG. 1, 101) executes a step (a) of replacing a memory access to a stack area in order to save a value of each register, with an access to a local variable in a compiler (FIG. 4A, step 406; FIG. 5A, step 506). The optimization of binary code completed by performing step (a) is shown as the first embodiment illustrated in FIGS. 4A to 4D. Then, the computer (FIG. 1, 101) sets the post-replacement local variable to be a register allocation target and allocates a register address to the post-replacement local variable.

In the embodiments of the present invention, a "stack area in order to save a value of each register" is an area known not to be actually aliased and is determined by linkage of the operating system. The "stack area in order to save a value of each register" is a register save area for example, and to put it more specifically, is a register save area for saving or restoring each register in the processor.

In addition, the computer (FIG. 1, 101) optionally executes a step (b) of replacing, under the condition that the stack pointer has not escaped, a memory access via the unescaped stack pointer with a local variable access in the compiler (FIG. 5A step 507). The optimization of binary code completed by performing (b) in addition to the step (a), is shown as the second embodiment shown in FIGS. 5A to 5D. The step (b) can be executed before execution of the step (a). Then, the computer (FIG. 1, 101) sets the post-replacement local variable to be a register allocation target, and as a result, a register address is allocated to the post-replacement local variable.

Figure 4B:
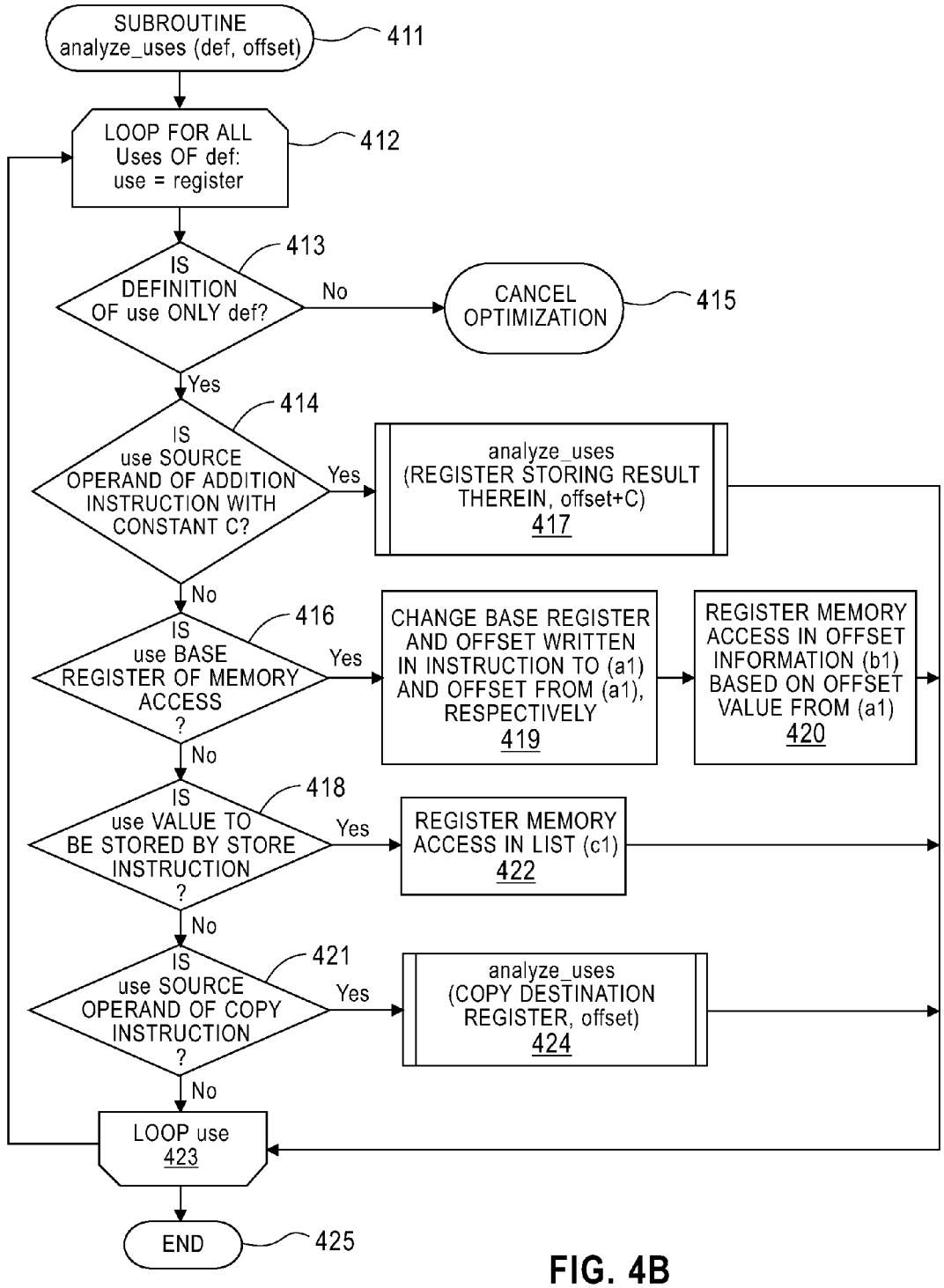
FIG. 4B shows a first embodiment of a subroutine analyze_uses(def, offset) of step 404 of FIG. 4A.
Figure 4C:
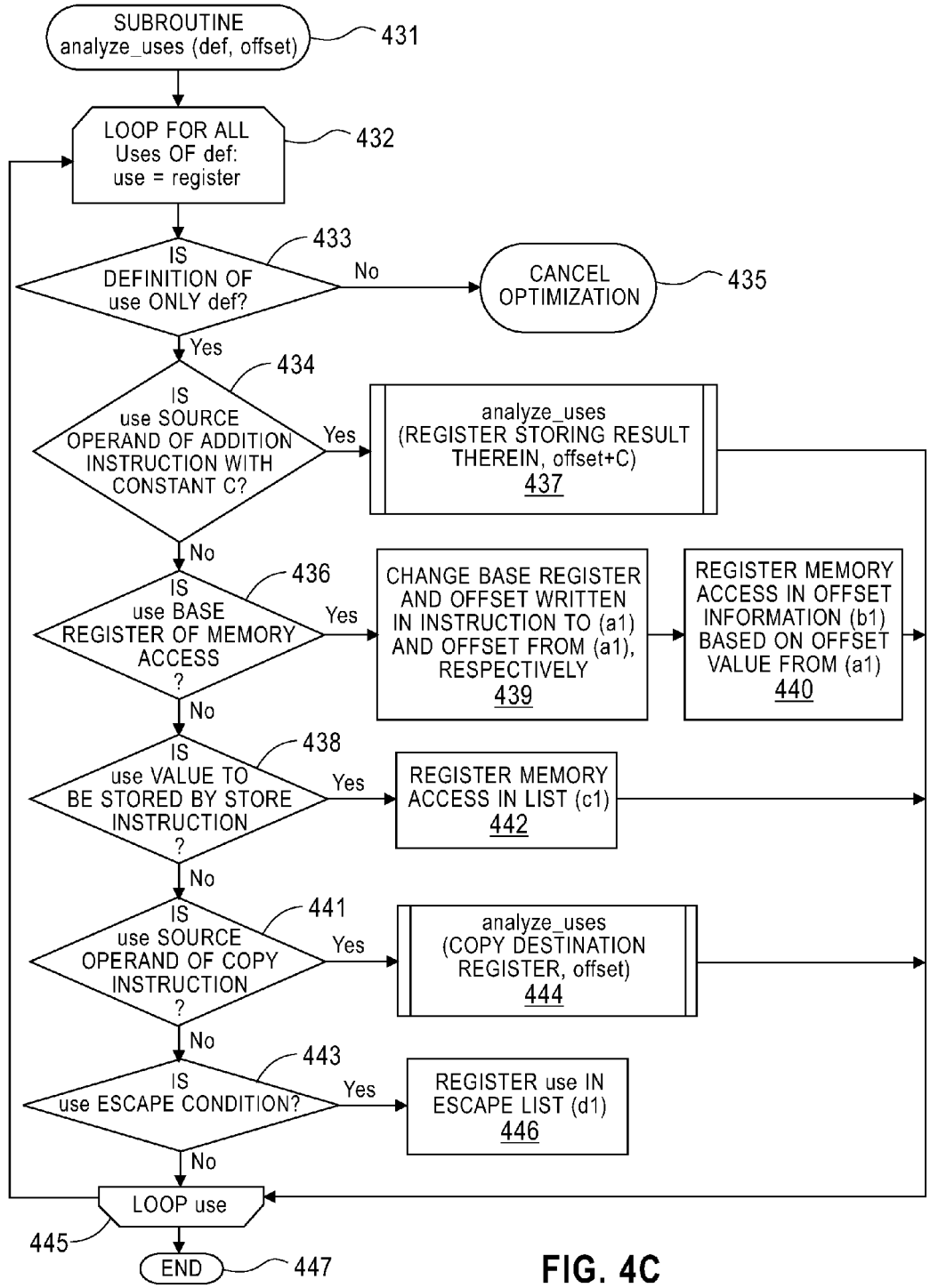
FIG. 4C shows a second embodiment of the subroutine analyze_uses(def, offset) of step 404 of FIG. 4A.
Figure 5A:
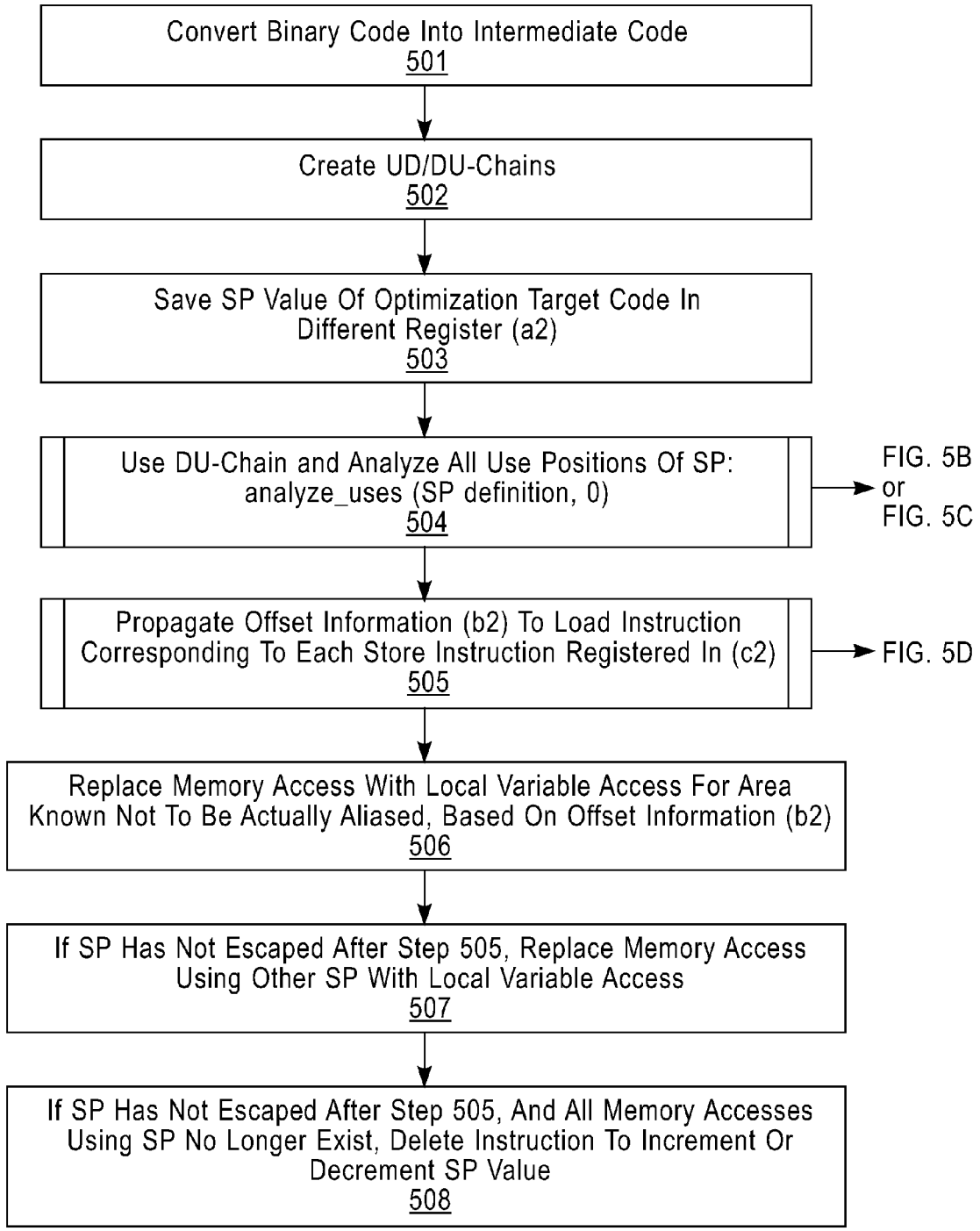
FIG. 5A shows a flowchart of a compiling method for optimizing binary code, which corresponds to a second embodiment of the present invention.
Figure 5B:
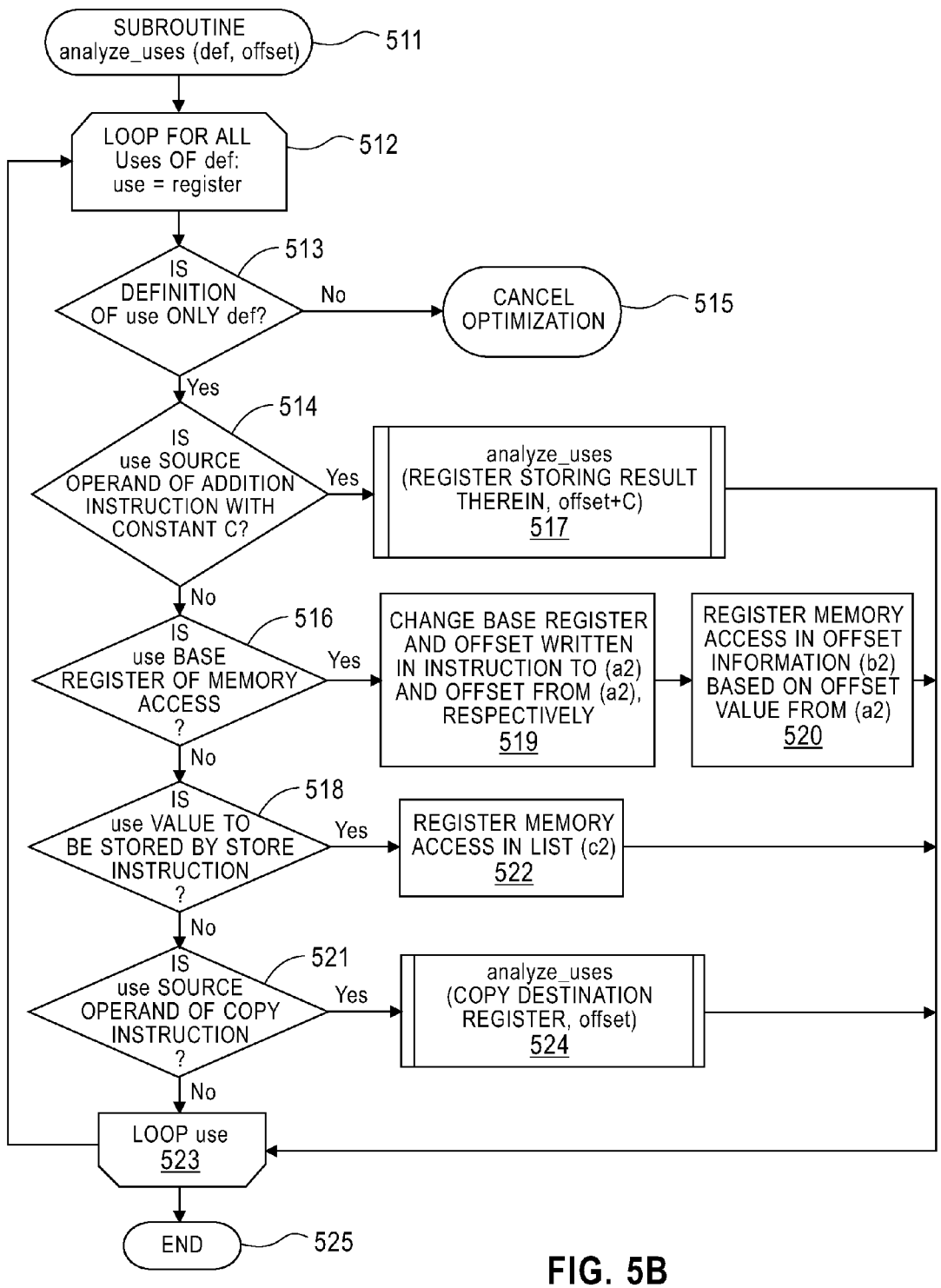
FIG. 5B shows a first embodiment of a subroutine analyze_uses(def, offset) of step 504 of FIG. 5A.

In one aspect of the present invention, the step (a) includes the steps of:

finding a register (first register) that serves as a stack pointer in the binary code and then saving the stack pointer in another register (second register) (FIG. 4A, step 403; FIG. 5A, step 503);

finding each memory access that uses the aforementioned first register as its base register in the binary code and then calculating an offset from a value of the aforementioned second register for the found memory accesses (FIG. 4A, steps 404 and 405; FIG. 5A, steps 504 and 505);

acquiring a set of memory accesses having the same offset from among the above calculated offsets (FIGS. 4B and 4C, steps 420 and 440; FIGS. 5A and 5B, steps 520 and 540); and determines whether or not a stack area to be accessed by the memory accesses of the acquired set is an area not to be aliased, by determining whether the area to be accessed by each of the memory accesses of the acquired set is in an offset area of the memory access to the stack area in order to save a value of each register (FIG. 4A, step 406; FIG. 5A, step 506).

The register serving as a stack pointer can be a stack pointer register defined by the system or a register defined by a specific pattern. The register defined by a specific pattern is a register which is used to acquire a pointer to a data structure known not to be referred by other threads, and is defined by a specific instruction sequence.

In one aspect of the present invention, the aforementioned stack pointer escapes if any one of or a combination of the following conditions is true:
(1) the value of the stack pointer is written in the memory;
(2) a call instruction that is not inlined exists; and
(3) an instruction that can cause an exception exists.

Figure 5C:
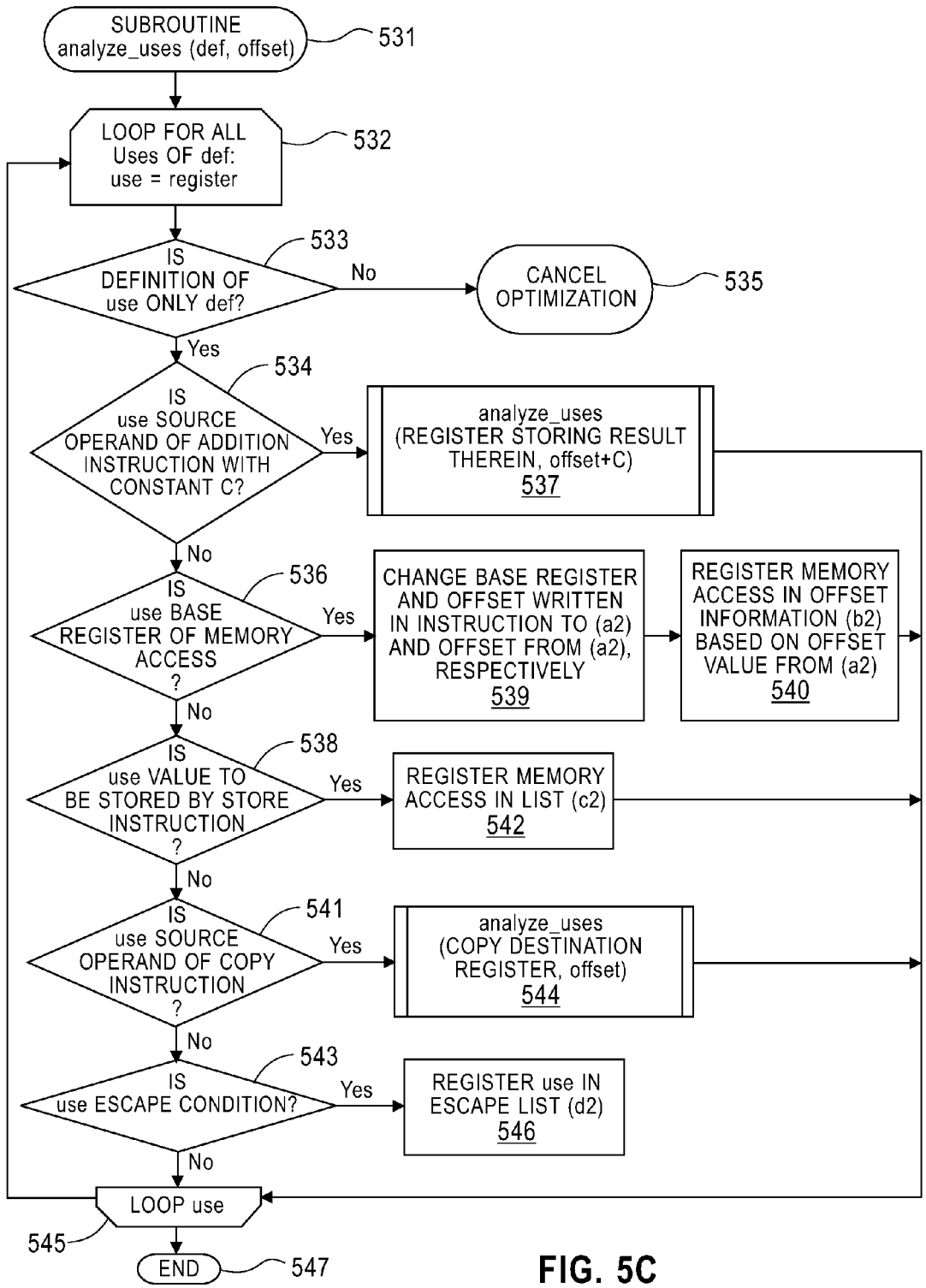
FIG. 5C shows a second embodiment of the subroutine analyze_uses(def, offset) of step 504 of FIG. 5A.

The aforementioned step (b) can further include a step of storing an escaping stack pointer in a list (FIG. 4C, step 446; FIG. 5C, step 546).

In addition, the aforementioned step (b) can further include a step of determining that the aforementioned stack pointer has not escaped, by finding that the aforementioned list is an empty set (FIG. 5A, step 507).

Figure 7A:
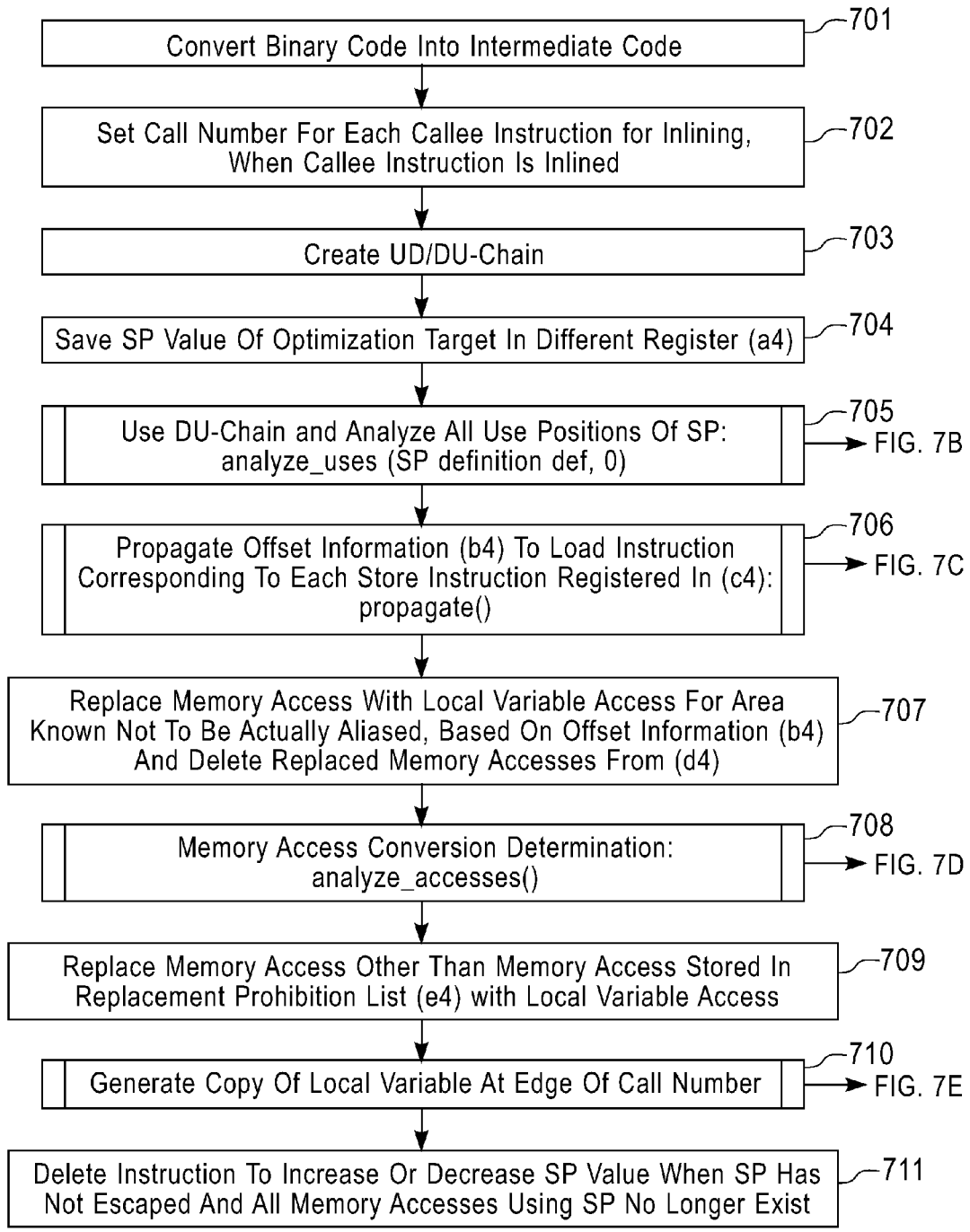
FIG. 7A shows a flowchart of a compiling method for optimizing binary code, which corresponds to a fourth embodiment of the present invention.

In the method for another aspect of the present invention, the computer (FIG. 1, 101) executes: a step (A) of giving, in response to an inline expansion of code to be called by a call instruction included in the binary code, a call number to each of the call instruction and the inlined code, e.g., a serial number to each of the call instructions and the inlined code (FIG. 6A, step 602; FIG. 7A, step 702), the step including a step of further creating a parent-child relationship information for the call numbers which includes the call number of the caller of the call instruction as a parent and includes the call number of the callee of the call instruction as a child, e.g., a tree structure graph; and a step (B) of replacing a memory access to a stack area in order to save a value of each register, with a local variable access in a compiler (FIG. 6A, step 607; FIG. 7, step 707). In addition, the step (B) uses the call numbers created in the aforementioned step (A) in the following manner. To put it more specifically, in one aspect of the present invention, the aforementioned step (B) of replacement includes the steps of:

finding a register (first register) that serves as a stack pointer in the binary code and saving the stack pointer in another register (second register) (FIG. 6A, step 604; FIG. 7A, step 704);

finding each memory access that use the aforementioned first register as its base register in the binary code and then calculating offsets from a value of the aforementioned second register for the found memory accesses (FIG. 6A, steps 605 and 607; FIG. 7A, steps 705 and 706);

creating a number (local variable number) for identifying a local variable for each of the memory access on the basis of a set of the aforementioned call number and the offset from the value of the second register (FIG. 8B); and determining, on the basis of the created local variable number, which local variable is to be accessed in place of the memory access to the stack area in order to save a value of each register, and then replacing the memory access with the access to the allocated/determined local variable (FIG. 7A, step 707).

The optimization of the binary code completed by performing the steps (A) and (B) is shown as the third embodiment shown in FIGS. 6A to 6C. Then, the computer (FIG. 1, 101) sets the post-replacement local variable to be a register allocation target, and as a result, a register address is allocated to the post-replacement local variable.

In addition, in one aspect of the present invention, the computer (FIG. 1, 101) can optionally execute a step (C) of prohibiting, if the stack pointer has escaped, if the stack pointer has escaped, processing memory accesses using the escaped stack pointer as their base address, by prohibiting replacement of a memory access belonging to each of a call number given to an instruction causing the escape (i.e., the instruction that has escaped) and a root call number of the call number (the root call number is specified from the aforementioned parent-child relationship information) with a local variable access (FIG. 7D, step 753), and meanwhile, replacing a remaining not-prohibited memory access with a local variable access in the compiler (FIG. 7A, step 709). The optimization of the binary code completed by performing the steps (A) to (C) is shown as the fourth embodiment shown in FIGS. 7A to 7E. Then, the computer (FIG. 1, 101) sets the post-replacement local variable to a register allocation target, and as a result, a register address is allocated to the post-replacement local variable.

In one aspect of the present invention, the step of replacing the unprohibited memory access with the local variable access in the step (C) includes the steps of:

finding a register (first register) that serves as a stack pointer in the binary code and then saving the stack pointer in another register (second register) (FIG. 7A, step 704);

finding each memory access using the aforementioned first register as its base register in the binary code and then calculating an offset from a value of the aforementioned second register for the found memory accesses (FIG. 7A, steps 705 and 706);

creating a number (local variable number) for identifying a local variable for the memory access on the basis of a set of the aforementioned call number and the offset from the value of the second register (FIG. 8B); and determining, on the basis of the created local variable number, which local variable is to be accessed in place of the unprohibited memory access, and then replacing the unprohibited memory access with the access to the allocated/determined local variable (FIG. 7A, step 709).

In one aspect of the present invention, the aforementioned stack pointer escapes if any one of or a combination of the following conditions is true:
(1) the value of the stack pointer is written in the memory;
(2) a call instruction that is not inlined exists; and
(3) an instruction that can cause an exception exists.

Figure 7B:
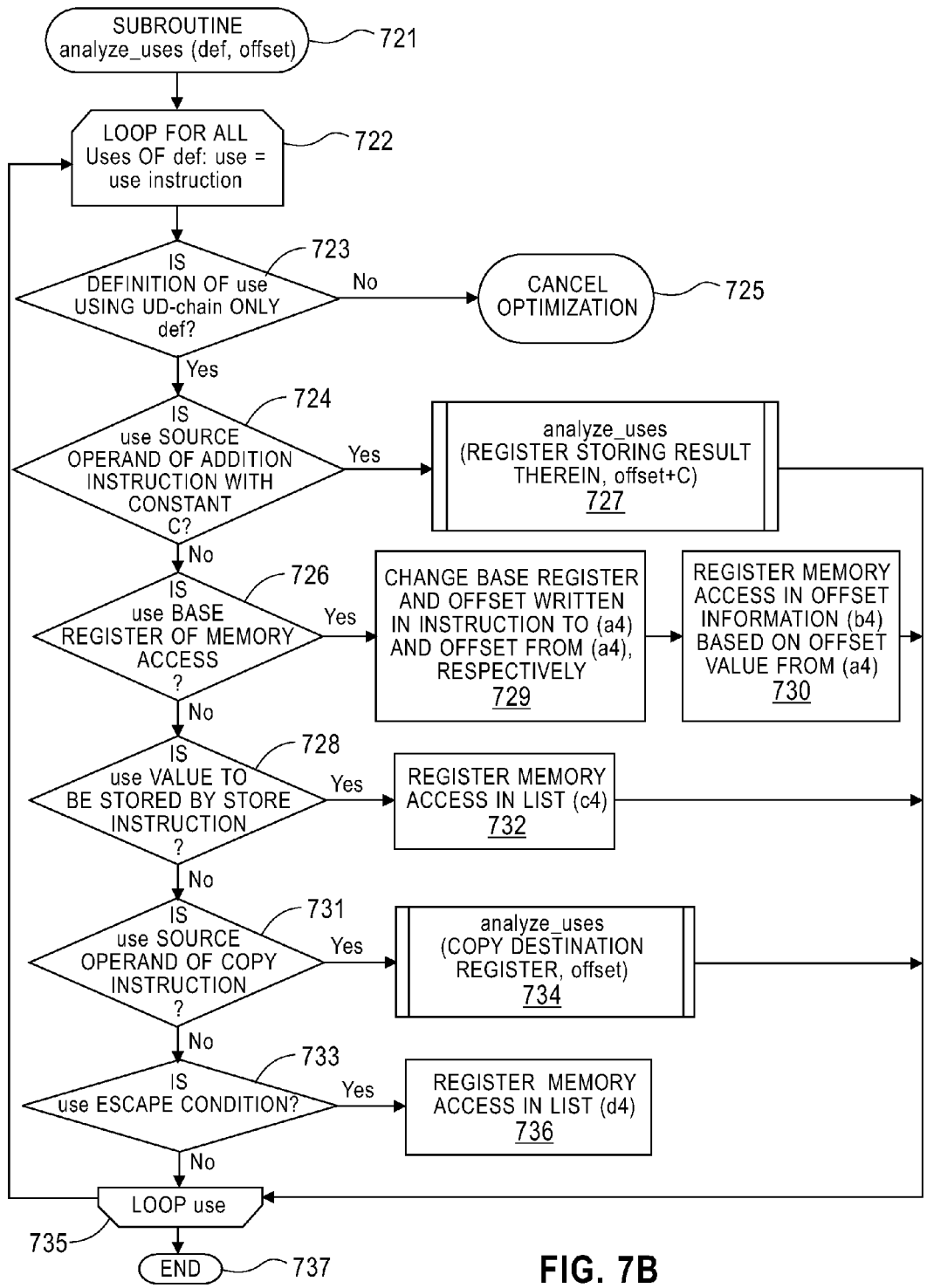
FIG. 7B shows an embodiment of a subroutine analyze_uses(def, offset) of step 705 of FIG. 7A.
Figure 7C:
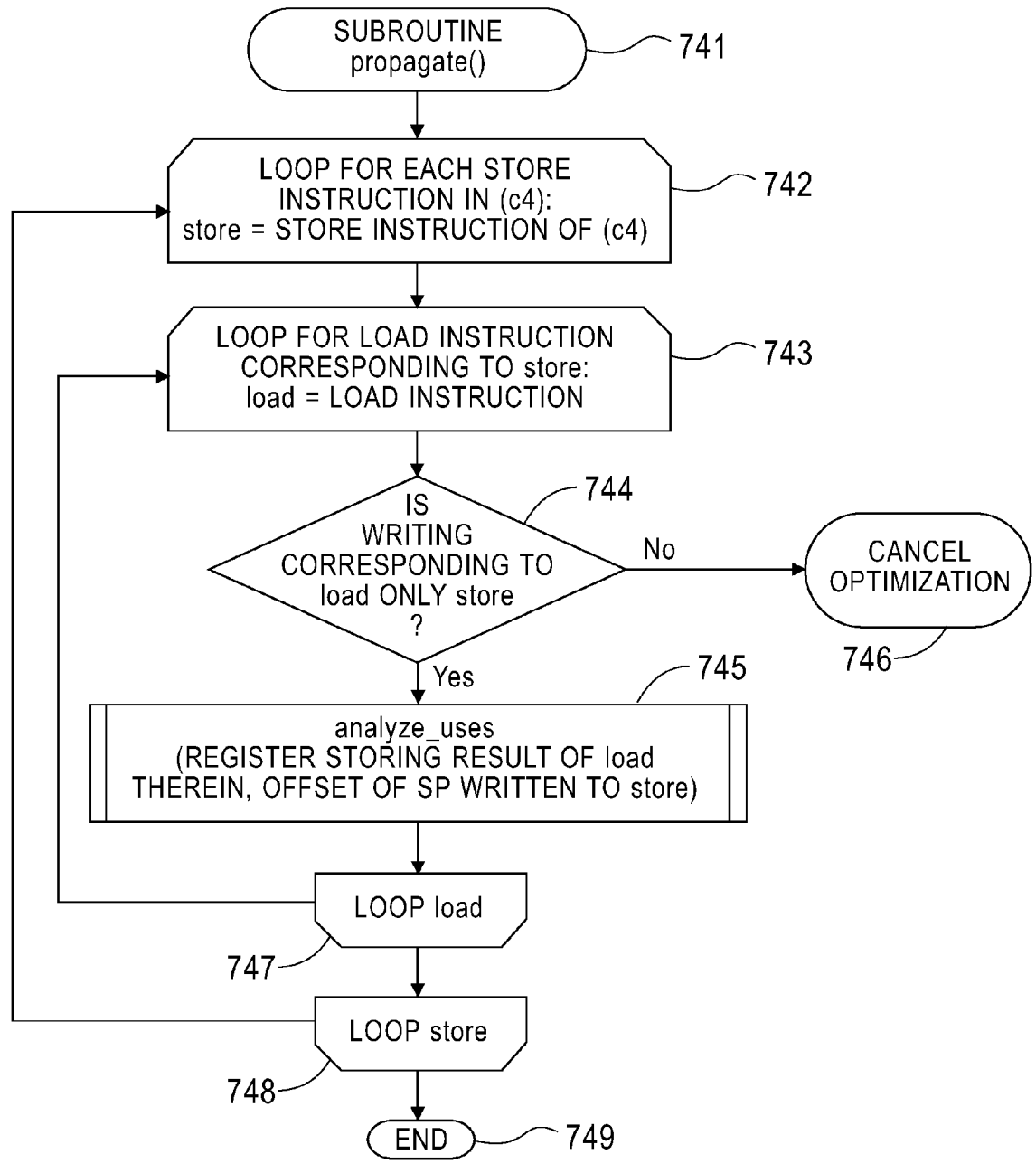
FIG. 7C shows an embodiment of a subroutine propagate( ) of step 706 of FIG. 7A.
Figure 7D:
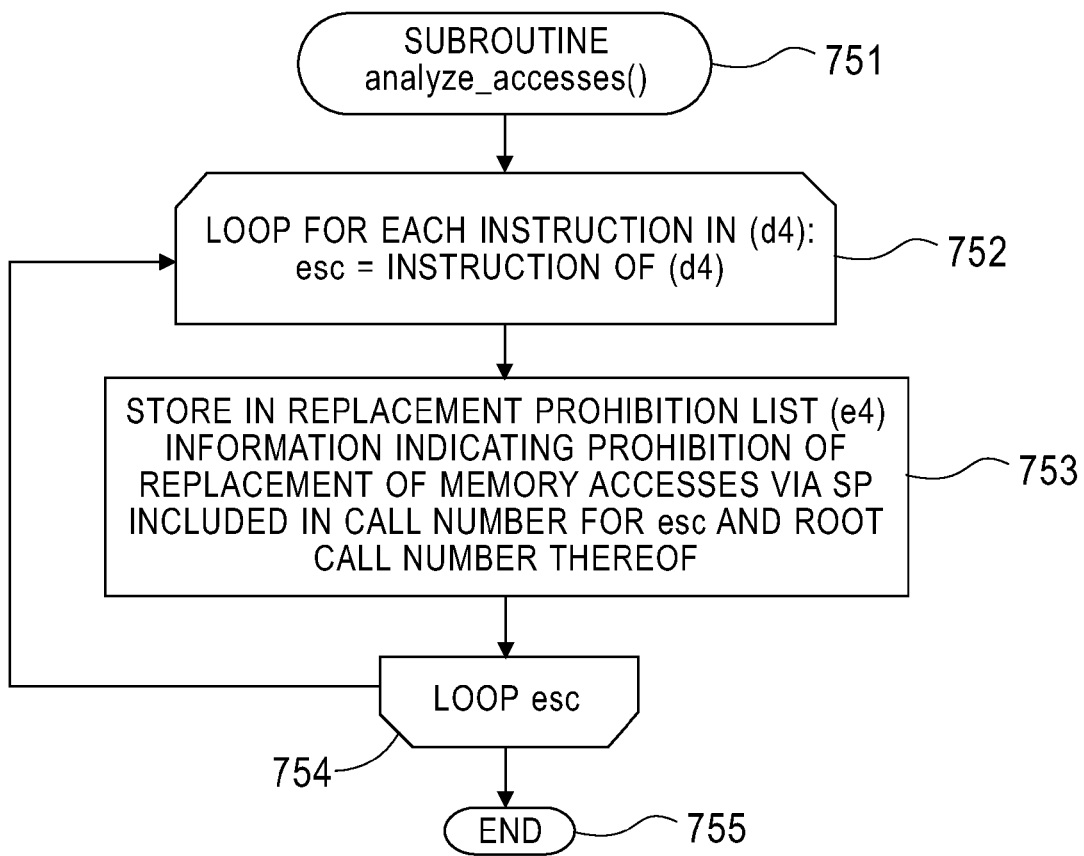
FIG. 7D shows an embodiment of a subroutine analyze_accesses( ) of step 708 of FIG. 7A.
Figure 7E:
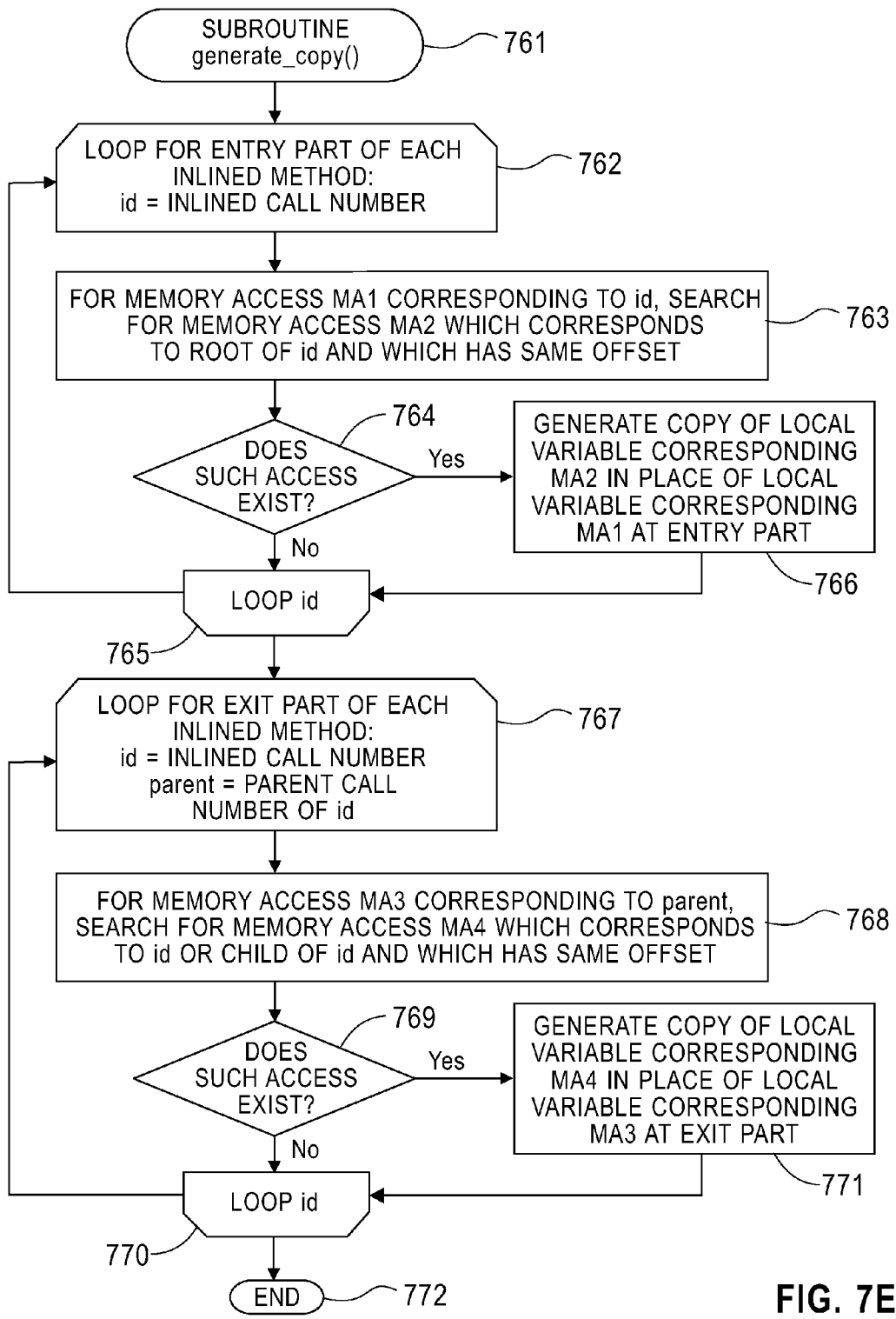
FIG. 7E shows an embodiment of a subroutine generate_copy( ) of step 710 of FIG. 7A.

In one aspect of the present invention, the method for the aforementioned other aspect can further include a step, executed by the computer (FIG. 1, 101), of generating, a copy of a local variable at each of an entry part and an exit part of an inlined method for a call instruction included in the binary code, if a memory access having the same offset as a memory access at an inner side of the entry part or the entry part exists at an outer side thereof, the local variable corresponding to the memory access at the outer side (FIG. 7E, steps 763, 764 and 766). In addition, the method for the aforementioned other aspect can further include a step, executed by the computer (FIG. 1, 101), of generating a copy of a local variable at each of an entry part and an exit part of an inlined method for a call instruction included in the binary code, if a memory access having the same offset as a memory access at an inner side of the entry part or the exit part exists at an outer side thereof, the local variable corresponding to the memory access at the outer side (FIG. 7E, steps 768, 769 and 771).

In one aspect of the present invention, the method for the aforementioned other aspect further can include a step, executed by the computer (FIG. 1, 101), of deleting an instruction to increment or decrement the value of the stack pointer, in accordance with an occurrence of an event that the stack pointer has not escaped, and also, the memory accesses using the stack pointer no longer exist (FIG. 7A, step 711).

In one aspect of the present invention, the computer (FIG. 1, 101) configured to optimize binary code includes a CPU (FIG. 1, 102) and a main memory (FIG. 1, 103). In addition, the computer (FIG. 1, 101) further includes a first replacement module (FIG. 2, 206) configured to replace, from among the memory accesses included in the aforementioned binary code, a memory access to a stack area in order to save a value of each register, with a local variable access. In addition, the computer (FIG. 1, 101) optionally includes a third replacement module (FIG. 2, 206) configured to replace, under the condition that the stack pointer has not escaped, a memory access via the unescaped stack pointer with a local variable access.

In one aspect of the present invention, the first replacement module (FIG. 2, 206) is configured to:

find a register (first register) that serves as a stack pointer in the binary code and then save the stack pointer in another register (second register);

find each memory access using the aforementioned first register as its base register in the binary code and then calculate an offset from a value of the second register for the found memory access;

acquire a set of memory accesses having the same offset from among the calculated offsets; and determines whether or not a stack area to be accessed by the memory accesses of the acquired set is an area not to be aliased, by determining whether the area to be accessed by each of the memory accesses of the acquired set is in an offset area of the memory access to the stack area in order to save a value of each register.

In one aspect of the present invention, the aforementioned stack pointer escapes if any one of or a combination of the following conditions is true:

(1) the value of the stack pointer is written in the memory;
(2) a call instruction that is not inlined exists; and
(3) an instruction that can cause an exception exists.

The third replacement module (FIG. 2, 206) is configured to store an escaping stack pointer in a list.

The third replacement module (FIG. 2, 206) is also configured to determine that the aforementioned stack pointer has not escaped, by finding that the list is an empty set.

A computer (FIG. 1, 101) configured to optimize binary code in another aspect of the present invention can include:

a call number module (FIG. 2, 205) configured in response to an inline expansion of code to be called by a call instruction included in the binary code, give a call number to each of the call instruction and inlined code; and a first replacement module (FIG. 2, 206) configured to replace a memory access to a stack area in order to save a value of each register, with a local variable access. The call number module (FIG. 2, 205) is further configured to create parent-child relationship information for the call numbers which includes a call number of the caller of the call instruction as a parent and includes a call number of the callee of the call instruction as a child.

The computer (FIG. 1, 101) can further include a second replacement module (FIG. 2, 206) configured, if the stack pointer escapes, to prohibit, if a stack pointer has escaped, process memory accesses using the escaped stack pointer as their base address, by prohibiting replacement of a memory access belonging to each of a call number given to an instruction causing the escape and a root call number of the call number with a local variable access, while replacing a remaining not-prohibited memory access with a local variable access, the root call number being specified from the parent-child relationship information.

In one aspect of the present invention, the computer (FIG. 1, 101) further includes the aforementioned call number module (FIG. 2, 205), and the first replacement module (FIG. 2, 206) is configured to:

find a register (first register) that serves as a stack pointer in the binary code and save the stack pointer in another register (second register);

find each memory access using the aforementioned first register as its base register in the binary code and calculate an offset from a value of the aforementioned second register for the found memory accesses;

create a number (local variable number) for identifying a local variable for the memory access on the basis of a set of the call number and the offset from the value of the second register; and determine, on the basis of the created local variable number, which local variable is to be accessed in place of the memory access to the stack area in order to save a value of each register, and then replacing the memory access with the access to the allocated/determined local variable.

In one aspect of the present invention, the second replacement module (FIG. 2, 206) is configured to:

find a register (first register) that serves as a stack pointer in the binary code and save the stack pointer in another different register (second register);

find each memory access using the aforementioned first register as its base register in the binary code and calculate an offset from a value of the aforementioned second register for the found memory access;

create a number (local variable number) for identifying a local variable for the memory access on the basis of a set of the call number and the offset from the value of the second register; and determine, on the basis of the created local variable number, which local variable is to be accessed in place of the unprohibited memory access, and then replacing the unprohibited memory access with the access to the allocated local variable.

In one aspect of the present invention, the aforementioned stack pointer escapes if any one of or a combination of the following conditions is true:

(1) the value of the stack pointer is written in the memory;
(2) a call instruction that is not inlined exists; and
(3) an instruction that can cause an exception exists.

In one aspect of the present invention, the computer (FIG. 1, 101) can further include a generation module configured to generate a copy of a local variable at each of an entry part and an exit part of an inlined method for a call instruction included in the binary code, if a memory access having the same offset as a memory access at an inner side of the entry part or the exit part exists at an outer side thereof, the local variable corresponding to the memory access at the outer side.

In one aspect of the present invention, the computer (FIG. 1, 101) can further include a deletion module configured to delete an instruction to increment or decrement the value of the stack pointer, in accordance with an occurrence of an event that the stack pointer has not escaped, and also, the memory accesses using the stack pointer no longer exist.

Hereinafter, the first to fourth embodiments of the present invention will be described in accordance with the drawings. Unless otherwise specified, the same reference numerals are used to denote the same objects throughout the drawings below.

FIG. 1 shows a basic block diagram of computer hardware in embodiments of the present invention.

The computer (101) includes a CPU (102) and a main memory (103), which are connected to a bus (104). A CPU that is based on 32-bit or 64-bit architecture is preferably used as the CPU (102). Here, examples of the CPU used as the CPU (102) include Core i (trademark) series, Core 2 (trademark) series, Atom (trademark) series, Xeon (trademark) series, Pentium (registered trademark) series and Celeron (registered trademark) series processors from Intel, Inc., and Phenom (trademark) series, Athlon (trademark), Turion (trademark) series and Sempron (trademark) series processors from AMD, Inc. A display (106) such as a liquid crystal display (LCD) can be connected to the bus (104) via a display controller (105). The display (106) is used to display, for the purpose of managing the computer, information about the computer connected to a network via a communication line and information about software operating on the computer, by use of an appropriate graphic interface. In addition, a disk (108) such as a hard disk or a silicon disk and a drive (109) such as a CD, DVD or BD drive can be connected to the bus (104) via a SATA or IDE controller (107). Moreover, a keyboard (111) and a mouse (112) can be connected to the bus (104) via a keyboard and mouse controller (110) or a USB bus (not shown).

The disk (108) stores therein an operating system, programs to provide a Java (registered trademark) processing environment such as J2EE, a Java (registered trademark) application, a Java (registered trademark) virtual machine (VM) and a Java (registered trademark) JIT compiler as well as other programs and data in such a way that the operating system, the programs and the data are loadable into a main memory.

The drive (109) is used for installing a program on the disk (108) from a CD-ROM, a DVD-ROM or a BD as required.

A communication interface (114) is compliant with an Ethernet (registered trademark) protocol, for example. The communication interface (114) is connected to the bus (104) via a communication controller (113) and physically connects the computer (101) to a communication line (115) and provides a network interface layer for a TCP/IP communication protocol of a communication function of the operating system of the computer (101). Note that, the communication line can be a wired LAN or a wireless LAN based on a wireless LAN connection standard such as IEEE 802.11a/b/g/n or the like, for example.

Figure 2:
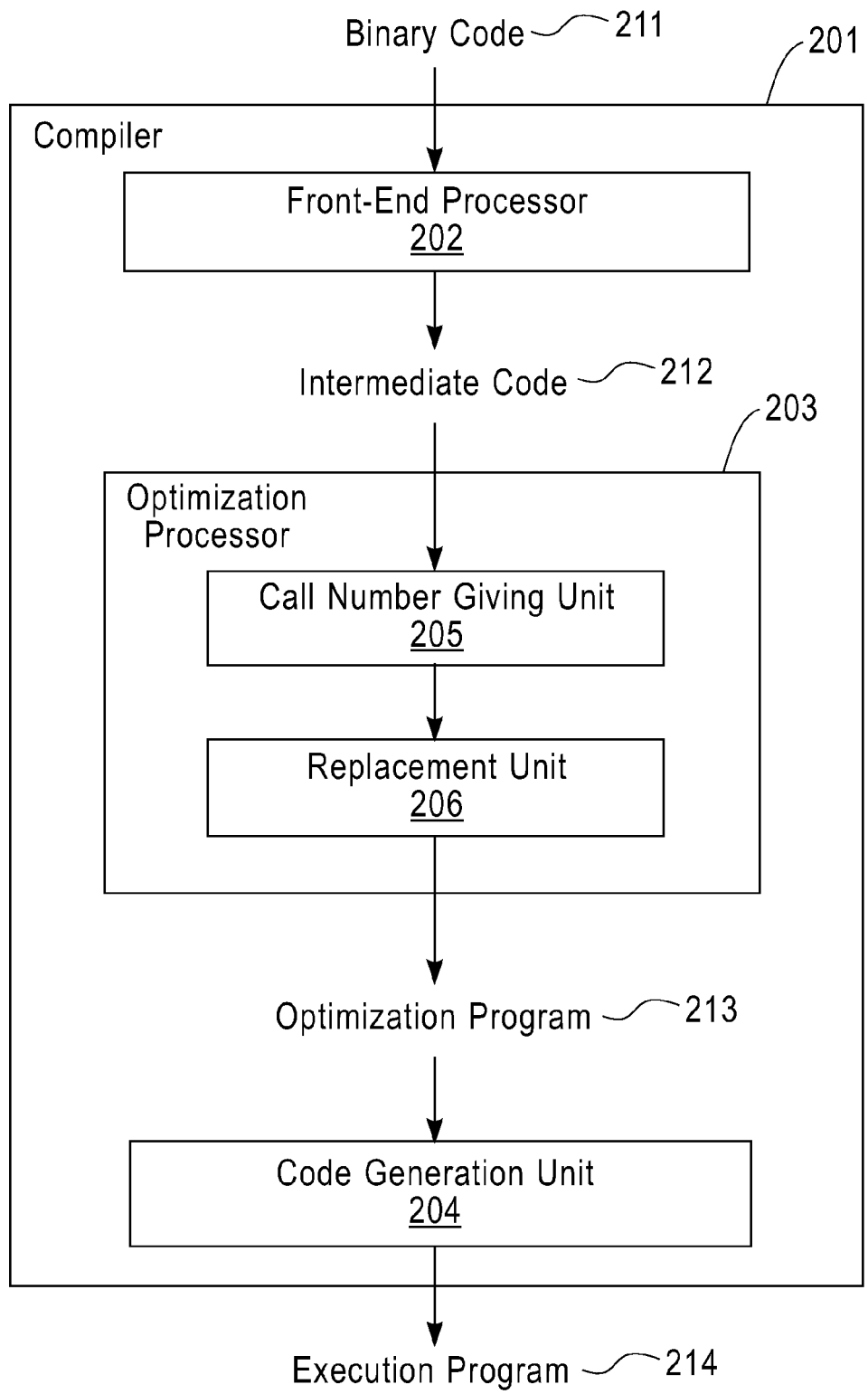
FIG. 2 is a functional block diagram of a compiler in the embodiments of the present invention.

FIG. 2 is a functional block diagram of a compiler (201) in the embodiments of the present invention.

The compiler (201) receives binary code (211) from an outside and converts the binary code (211) into an execution program (214) executable by a computer. During the conversion from the binary code (211) into the execution program (214), the compiler (201) performs an optimization for the purpose of effectively utilizing the computer resources. Such an optimization makes it possible to increase the execution speed of the execution program and to reduce the size of the execution program.

The compiler (201) includes a front-end processor (202), an optimization processor (203) and a code generation module (204). Upon receipt of the binary code (211) from an outside, the front-end processor (202) converts the received binary code (211) into intermediate code (212) suitable for optimization processing. Then, the front-end processor (202) transmits the intermediate code (212) to the optimization processor (203). The optimization processor (203) performs various optimizations on the intermediate code (212). The optimization processor (203) transmits an optimized program (213) obtained by optimizing the intermediate code (212) to the code generation module (204). The code generation module (204) converts the optimized program (213) into the execution program (214) executable by a computer or an operating system and then outputs the execution program (214) to an outside.

In the embodiments, the binary code (211) is an optimization target code and is a Java (registered trademark) source code, for example. The binary code (211) can include the following properties, for example.

Application code (application emulation)

As the properties of code to call the binary code, the code includes the following two properties:

No access above the top of stack is made; and

No value other than a stack pointer is put in a stack pointer register.

In the embodiments, the intermediate code (212) is bytecode or code written by an intermediate language (also referred to as intermediate representation) such as Register Transfer Language (RTL), for example. Examples of the bytecode include a Java (registered trademark) bytecode obtained by applying predetermined conversion to a Java (registered trademark) source code and .NET Framework. RTL is an intermediate language used by the GNU Compiler Collection. The optimization target code can be the entirety of a program written by an intermediate language or a partial program written by the intermediate language. The partial program can be a module or an object that performs only specific processing, for example.

The optimization processor (203) includes a replacement module (206). In addition, the optimization processor (203) can further include a call number module (205). The call number module (205) is used in the third and fourth embodiments and is an optional configuration. In addition, the optimization processor (203) can further include a generation module (not shown). Moreover, the optimization processor (203) can further include a deletion module (not shown).

The call number module (205) is configured to give each call instruction a call number in accordance with an occurrence of an event that code to be called by call instructions included in the binary code is inline expanded. In addition, the call number module (205) is configured to create parent-child relationship information of the call numbers. The created parent-child relationship information can be stored in the memory (103) or the storage module (108), for example.

If the optimization processor (203) does not include the call number module (205), the replacement module (206) replaces, from among memory accesses, a memory access to a stack area in order to save a value of each register, with a local variable access, and also, under the condition that the stack pointer has not escaped, optionally replaces a memory access via the unescaped stack pointer with a local variable access. Note that, the replacement module (206) can be divided into a first replacement module configured to perform the former replacement and a third replacement module configured to perform the latter replacement.

If the optimization processor (203) does include the call number module (205), the replacement module (206) replaces, from among memory accesses, a memory access to a stack area in order to save a value of each register, with a local variable access, and also, under the condition that the stack pointer has not escaped, optionally prohibits, from among the memory accesses using the escaped stack pointer as their base address, replacement of a memory access belonging to a call number given to an instruction causing the escape and a root call number of the call number with a local variable access, and meanwhile, replaces a remaining not-prohibited memory access with a local variable access. Note that, the replacement module (206) can be divided into a first replacement module configured to perform the former replacement and a second replacement module configured to perform the latter replacement mentioned.

The replacement module (206) can include all of the first replacement module, the second replacement module and the third replacement module. Then, the replacement module (206) can be configured to use the first replacement module and the third replacement module if the user selects to perform an optimization of binary code without using a call number and configured to use the first replacement module and the second replacement module if the user selects to perform an optimization of binary code with a call number.

The generation module generates, for an entry part or an exit part of an inlined method for a call instruction included in the bytecode, a copy of a local variable at the entry part or the exit part if offsets overlap each other.

The deletion module deletes an instruction to increment or decrement the value of the stack pointer, if the stack pointer has not escaped, and also the memory accesses using the stack pointer no longer exist.

Figure 3:
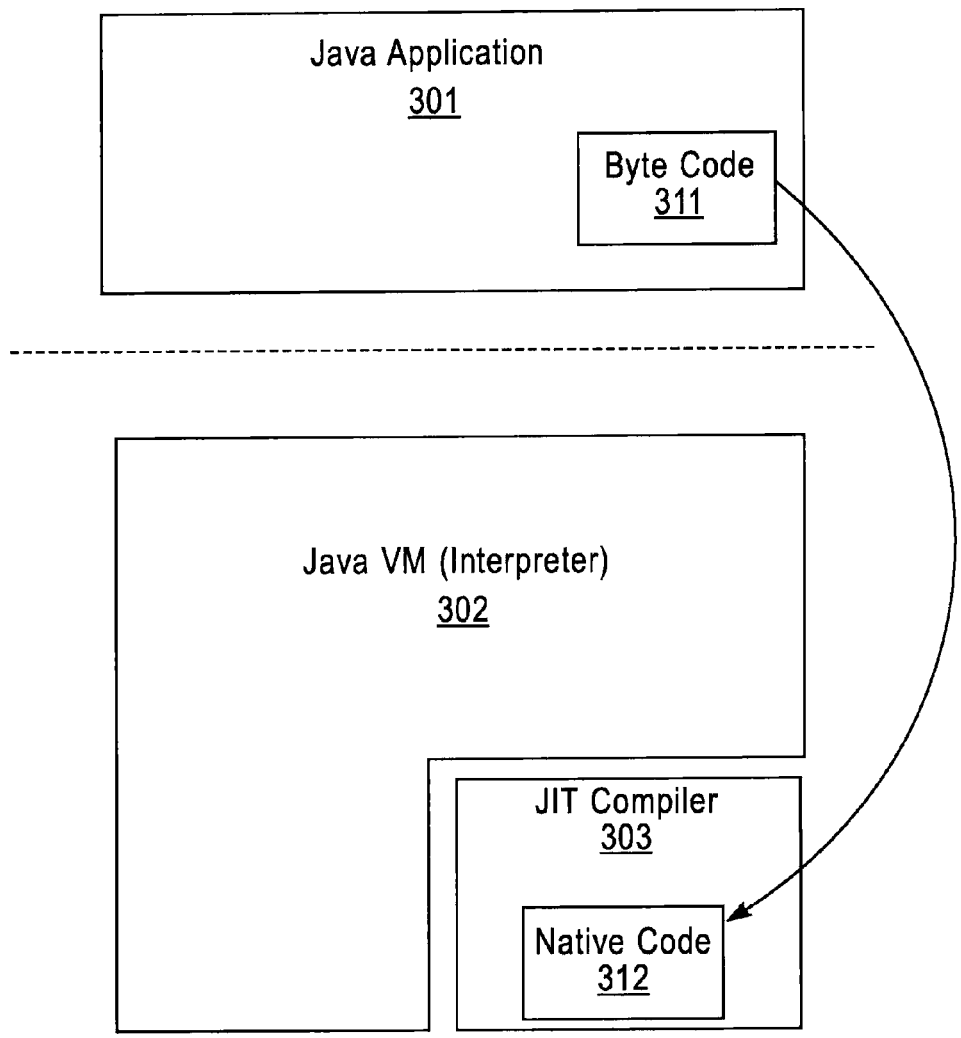
FIG. 3 shows a Java compiler corresponding to one embodiment in which the present invention can be incorporated.

FIG. 3 shows a Java compiler corresponding to one embodiment in which the present invention can be incorporated.

A Java application (301) written in Java (registered trademark) is converted into an intermediate language called bytecode (311). Accordingly, the Java application (301) can be executed on any computer as long as an environment to implement a Java (registered trademark) VM (302) is prepared. Meanwhile, in a computer on which the bytecode (311) is executed, the overhead becomes a problem because interpretation is performed. In this respect, a Just-In-Time (JIT) compiler (303) allows high-speed execution by dynamically converting (compiling) the bytecode (311) into a machine language to achieve conversion into native code (312) during the execution of the bytecode (311).

FIG. 4A shows a flowchart of a compiling method for optimizing binary code, which corresponds to a first embodiment of the present invention.

In step 401, the front-end processor (202) converts the binary code (211) into the intermediate code (212). During the optimization processing below, the processing is performed on the intermediate code (212), basically. However, the binary code (211) and the intermediate code (212) are correlated. Thus, it is possible to refer to the binary code (211) when necessary during the optimization processing.

In step 402, the optimization processor (203) creates a Use-Definition Chain/Definition-Use Chain (UD/DU-chain) from the intermediate code (212). The UD-chain means a reference definition chain and expresses, as a set of instructions for variable reference, a value to be referred is defined by which instruction or whether the value can be defined. The DU-chain means a definition reference chain and expresses, as a set of instructions for definition of each variable, a value to be defined is referred by which instruction or whether the value can be referred. The result obtained by the UD-chain is used in step 413 (FIG. 4B) and step 433 (FIG. 4C). The result obtained by the DU-chain is used in step 404.

In step 403, since the value of the stack pointer of the binary code (211) can be changed by an addition or subtraction instruction (addition instruction, for example), the optimization processor (203) saves the value of the stack pointer before such a change (hereinafter, referred to as an "original SP value") in a different register (a1). To put it more specifically, the original SP value is backed up in the different register (a1). The reason for backing up the original SP value is because the original SP value is used when a relative offset is to be found from the original SP value for each memory access. The different register (a1)) is provided in a register of the CPU or in the main memory (103). Note that, the binary code (211) is used in step 403. This is because since the binary code (211) and the intermediate code (212) are correlated as described above, information on the binary code (211) can be viewed from the intermediate code (212).

In step 404, the optimization processor (203) uses the DU-chain and analyzes all the use positions of the stack pointer. The flow chart of this analysis is separately shown in a subroutine shown in FIG. 4B or FIG. 4C. The definition def and offset of the SP are the arguments of the subroutine analyze_uses, and thus the calling side sets the respective values thereof.

In step S405, the optimization processor (203) propagates offset information (b1) of each store instruction in FIG. 4B or FIG. 4C to a load instruction corresponding to each store instruction registered in a list (c1) of memory accesses, which is created in FIG. 4B or FIG. 4C. The flowchart of the propagation is separately shown in the subroutine shown in FIG. 4D. In step 455 of FIG. 4D, the offset information (b1) of each store instruction is actually propagated. The propagation means to treat a register storing therein the result of load, as the stack pointer, and then to copy the offset information of the stack pointer, which is written in the store instruction at this time, from the offset information at the time of execution of the store instruction. Here, the offset information has three kinds of information including an offset value, corresponding memory accesses and a local variable.

In step 406, for an area found (known) not to be actually aliased, e.g., a register save area (also referred to as a register save area) on the basis of the offset information (b1), each memory access is replaced with a local variable access in the compiler. Whether an area is the area not to be aliased or not is determined by determining whether the area to be accessed by each memory access in the offset information (b1) is in the offset area of the memory access to the stack area in order to save a value of each register, or not. If the area to be accessed by each memory access is in the offset area, the stack area to be accessed by each memory access is an area not to be aliased. Meanwhile, if the area to be accessed by each memory access is not in the offset area, the stack area to be accessed by each memory access is an area to be aliased. The aforementioned local variable is determined in accordance with FIG. 8A. Then, the post-replacement local variable access is replaced with a register access. The same memory access found (known) not to be actually aliased is also a memory access to a stack area in order to save a value of each register.

In the optimization according to the first embodiment of the present invention, only the memory accesses to the register save area are optimized while memory accesses other than these memory accesses are not optimized.

FIG. 4B shows a first embodiment of a subroutine analyze_uses(def, offset) of step 404 of FIG. 4A.

The definition def of an SP is a value of the stack pointer positioned at the top of the program, basically. In addition, if the definition def of the SP does not explicitly appear in the program, the processing is performed with an assumption that the def of the stack pointer is at an entry part of a method. In addition, the definition def of an SP is a specific pattern that can be regarded as a stack pointer.

In step 411, a subroutine analyze_uses (def, offset) starts. Here, def is the definition def of a stack pointer.

In step 412, the optimization processor (203) repeatedly performs the processing of steps 413 to 423 for all the uses (registers) of the def.

In step 413, the optimization processor (203) uses a UD-chain and checks def from the use position and determines whether the definition of the use is only def. If the definition of the use is only def, the processing proceeds to step 414. Meanwhile, if the definition of the use is not only def, the processing proceeds to step 415.

In step 414, the optimization processor (203) determines whether the use is a source operand of an addition instruction with a constant C or not. Here, an assumption is made that an instruction to subtract a constant is previously converted into an addition instruction. If the use is not a source operand of an addition instruction with a constant C, the processing proceeds to step 416. Meanwhile if the use is a source operand of an addition instruction with a constant C, the processing proceeds to step 417.

In step 415, since the definition of the use is not only def, the optimization processor (203) cancels the optimization. Thus, the compiling processing cancels the optimization processing being performed by the optimization processor (203) and then proceeds to the next processing (FIG. 2, 204).

In step 416, the optimization processor (203) determines whether the use is the base register to a memory access or not. If the use is not the base register to a memory access, the processing proceeds to step 418. Meanwhile if the use is the base register to a memory access, the processing proceeds to step 419.

In step 417, the optimization processor (203) makes a recursive call to step 411 by using, as the parameters, the register storing therein the result of the addition and a value obtained by adding the constant C to the offset passed as a parameter in step 411. Upon return from the optimization call, the processing returns to step 423.

In step 418, the optimization processor (203) determines whether the use is a value to be stored by a store instruction. If the use is not a value to be stored by a store instruction, the processing proceeds to step 421. Meanwhile, if the use is a value to be stored by a store instruction, the processing proceeds to step 422.

In step 419, the optimization processor (203) changes the base register and the offset written in the instruction on the intermediate code, which correspond to the memory access found in step 416, to a different register (a1)) and the offset from the different register (a1), respectively.

In step 420, the memory access found in step 416 and its offset value are registered in the offset information (b1) on the basis of the offset value from the different register (a1). To put it more specifically, the optimization processor (203) searches the offset values, and when the same offset value is found in the set of offsets (a1), the memory accesses having the same offset value are regarded as one element. Thus, a set of memory accesses having the same offset can be acquired. Meanwhile, a memory access having a different offset value is regarded as a different element. Thus, a set of memory accesses each having the same offset value different from the aforementioned offset value can be acquired. The offset information (b1) on the aforementioned one element or the different element has three kinds of information including the offset value, the corresponding memory accesses, and a local variable, for example. Note that, the local variable is generated in accordance with the flowchart shown in FIG. 8A, during the replacement processing of a memory access with a local variable. The offset information (b1) is stored in the main memory (103), for example. Then, the processing proceeds to step 423.

In step 421, the optimization processor (203) determines whether the use is a source operand of a copy instruction. If the use is not a source operand of a copy instruction, the processing proceeds to step 423. If the use is a source operand of a copy instruction, the processing proceeds to step 424.

In step 422, the optimization processor (203) registers the memory access, which is the store instruction found in step 418, to the list (c1). The list (c1) is stored in the main memory (103), for example.

In step 423, the optimization processor (203) returns to step 412 in order to repeat the steps from steps 412 to 422.

In step 424, the optimization processor (203) makes a recursive call by using, as the parameters, the register of the copy destination and the offset passed as a parameter in step 411. Upon return from the optimization call, the processing returns to step 423.

Step 425 corresponds to the end of the subroutine analyze_uses(def, offset).

FIG. 4C shows a second embodiment of the subroutine analyze_uses(def, offset) of step 404 of FIG. 4A.

FIG. 4C is the same as FIG. 4B except that steps 443 and 446 are added. To put it more specifically, steps 431 to 442, 444, 445 and 447 of FIG. 4C correspond to steps 411 to 422, 424, 423 and 425 of FIG. 4B, respectively. Accordingly, only additional steps 443 and 446 in FIG. 4C will be described below.

In step 441, the optimization processor (203) determines whether the use is a source operand of a copy instruction. If the use is not a source operand of a copy instruction, the processing proceeds to step 443. If the use is a source operand of a copy instruction, the processing proceeds to step 444.

In step 443, the optimization processor (203) determines whether the use is an escape condition or not. If the use is not an escape condition, the processing proceeds to step 445. Meanwhile, if the use is an escape condition, the processing proceeds to step 446.

In step 446, an instruction at the position of the use, which is an escape condition, is registered in an escape list (d1). To put it more specifically, the registered position is a position where escape is performed. The escape list (d1) is stored in the main memory (103), for example. Alternatively, a flag can be provided to the use which is an escape condition or the instruction at the position of the use.

Figure 4D:
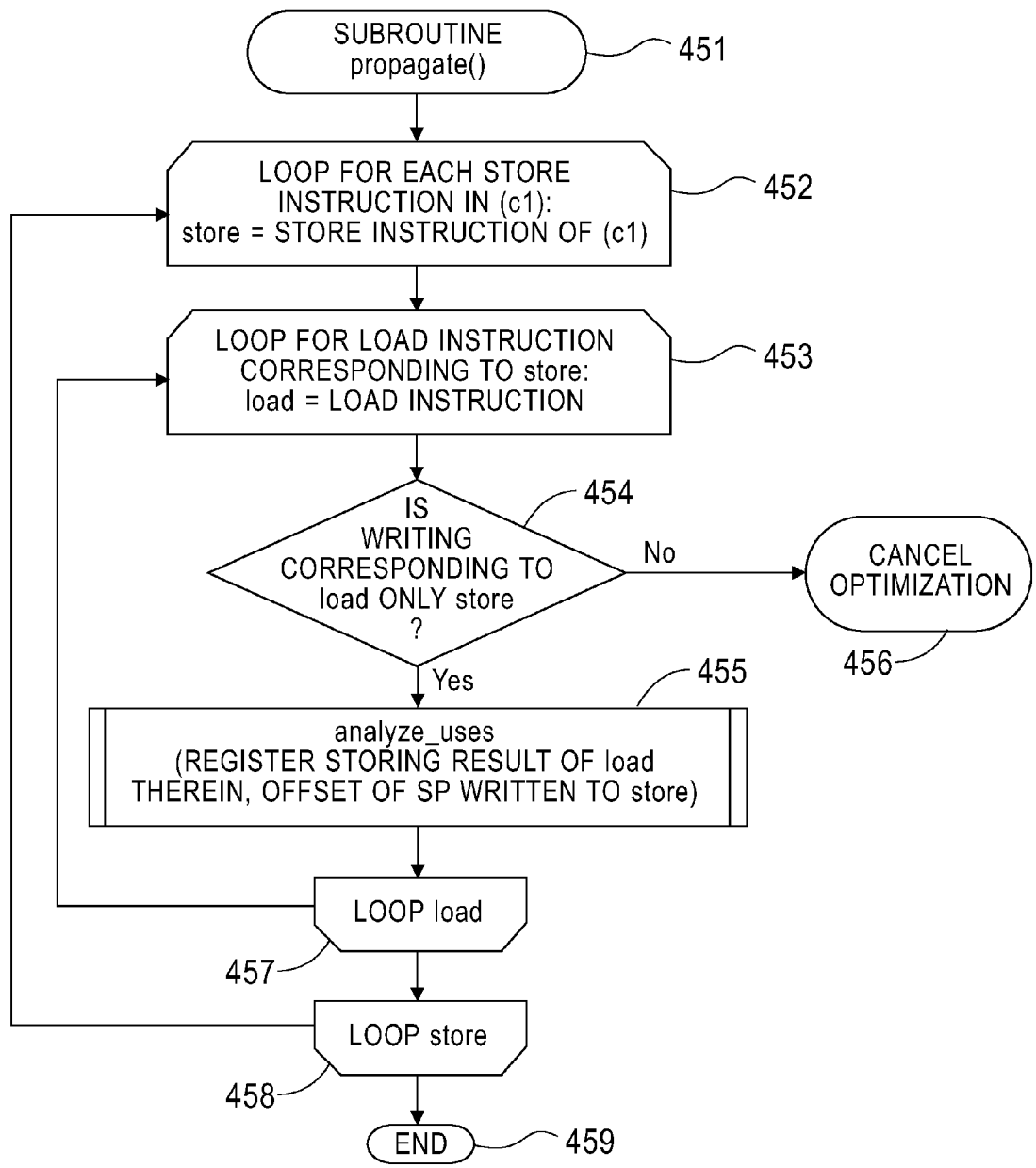
FIG. 4D shows an embodiment of a subroutine propagate( ) of step 405 of FIG. 4A.

FIG. 4D shows an embodiment of a subroutine propagate( ) of step 405 of FIG. 4A.

In step 451, a subroutine propagate( ) starts.

In step 452, the optimization processor (203) repeatedly performs the processing of steps 453 to 458 for each store instruction (hereinafter, also referred to as a "store") for the list (c1) of memory accesses in step 422 of FIG. 4B or the list (c1) of memory accesses in step 442 of FIG. 4C.

In step 453, the optimization processor (203) repeatedly performs the processing from steps 454 to 457 for a load instruction corresponding to the store.

In step 454, the optimization processor (203) determines whether the writing corresponding to the load instruction is only the store. If the writing corresponding to the load instruction is only the store, the processing proceeds to step 455. Meanwhile, if the writing corresponding to the load instruction is not only the store, the processing proceeds to step 456.

In step 455, the optimization processor (203) propagates the offset information (b1) of each store instruction. The optimization processor (203) performs the propagation by treating the register storing therein the result of load as the stack pointer, and then copying the offset information of the stack pointer, which is written in the store instruction at this time, from the offset information at the time of execution of the store instruction. To put it more specifically, the optimization processor (203) passes (i.e., propagates), as the parameters, the register storing therein the result of load and the offset of the stack pointer, which is written in the store, and makes a subroutine call to step 411 (FIG. 4B) or step 431 (FIG. 4C). Upon return from the optimization call, the processing returns to step 457.

In step 456, the optimization processor (203) cancels the optimization. Accordingly, the compiling processing cancels the optimization processing being performed by the optimization processor (203) and proceeds to the next processing (FIG. 2, 204).

In step 457, the optimization processor (203) returns to step 453 in order to repeat the steps from steps 454 and 455.

In step 458, the optimization processor (203) returns to step 452 in order to repeat the steps from steps 453 to 457.

Step 459 corresponds to the end of the subroutine propagate( ).

FIG. 5A shows a flowchart of a compiling method for optimizing binary code, which corresponds to a second embodiment of the present invention.

FIG. 5A is the same as FIG. 4A except that steps 507 and 508 are added. To put it more specifically, steps 401 to 406 of FIG. 4A correspond to steps 501 to 506 of FIG. 5A, respectively. Accordingly, only additional steps 507 and 508 in FIG. 5A will be described below.

In step 507, after step 505, under the condition that the stack pointer has not escaped, the optimization processor (203) replaces a memory access using a stack pointer other than the aforementioned stack pointer with a local access variable.

The fact that the stack pointer has not escaped is determined by finding that the list in which the stack pointer that escapes is stored is an empty set. A stack pointer escapes if one of or a combination of the following conditions is true: (1) the value of the stack pointer is written in the memory; (2) a call instruction that is not inlined exists; and (3) an instruction that can cause an exception exists.

In step 508, if all the memory accesses using the stack pointer no longer exist after step 505, the optimization processor (203) deletes an instruction to increment or decrement the value of the stack pointer. The instruction to increment or decrement the value of the stack pointer is an addition instruction with the constant C, which is shown in step 514 of FIG. 5B below, for example.

FIG. 5B shows a first embodiment of a subroutine analyze_uses(def, offset) of step 504 of FIG. 5A.

The steps in steps 511 to 525 of FIG. 5B correspond to the steps in steps 411 to 425 of FIG. 4B respectively. Accordingly, the description of steps 511 to 525 of FIG. 5B is omitted in this description.

FIG. 5C shows a second embodiment of a subroutine analyze_uses(def, offset) of step 504 of FIG. 5A.

The steps in steps 531 to 547 of FIG. 5C correspond to the steps in steps 431 to 447 of FIG. 4C respectively. Accordingly, the description of steps 531 to 547 of FIG. 5C is omitted in this description.

Figure 5D:
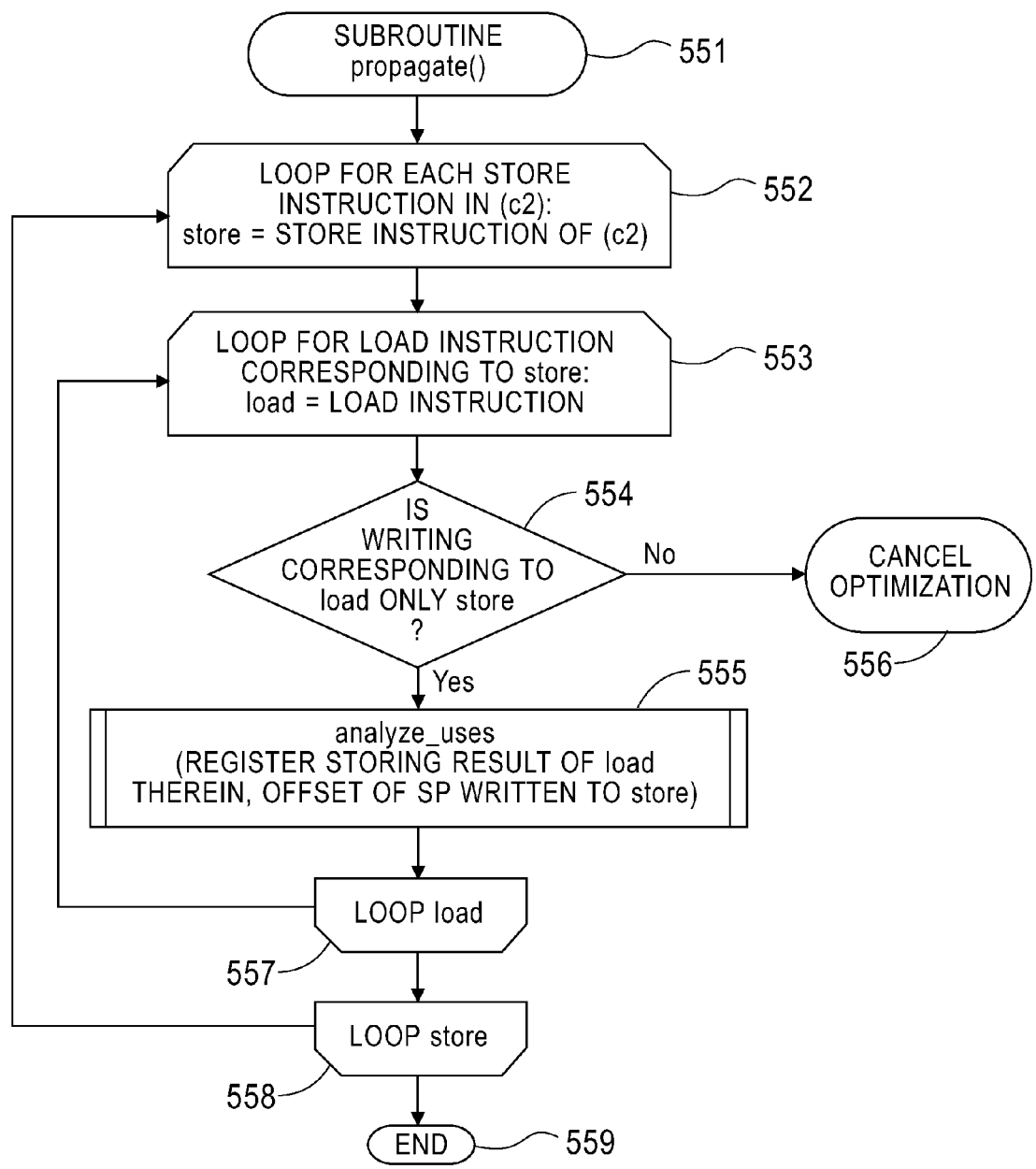
FIG. 5D shows an embodiment of a subroutine propagate( ) of step 505 of FIG. 5A.

FIG. 5D shows an embodiment of a subroutine propagate( ) of step 505 of FIG. 5A.

The steps in steps 551 to 559 of FIG. 5D correspond to the steps in steps 451 to 459 of FIG. 4D respectively. Accordingly, the description of steps 551 to 559 of FIG. 5D is omitted in this description.

FIG. 6A shows a flowchart of a compiling method for optimizing binary code, which corresponds to a third embodiment of the present invention.

In step 601, the front-end processor (202) converts the binary code (211) into the intermediate code (212).

In step 602, when code (also referred to as a "call instruction destination") to be called by call instructions included in the binary code (211) is inlined, the optimization processor (203) gives a corresponding call number to each of the call instructions for the inlining and the inlined code. The call number is a number that can uniquely identify each of the call instructions, for example. A serial number can be given to each call number as the call number, for example. The optimization processor (203) creates parent-child relationship information for a call number given to each of the call instructions. The parent-child relationship information is information indicating that the call number of the caller of the call instruction is a parent whereas the call number of the callee of the call instruction is a child. The parent-child relationship information can be a tree structure graph denoted by reference numeral 903 in FIG. 9A below, for example. In addition, a call number being the root of a call number given to each of the call instructions is a number given to a code string on which no inlining is performed.

In step 603, the optimization processor (203) creates a UD/DU-chain from the intermediate code (212). The UD/DU-chain is described in FIG. 4A.

In step 604, the optimization processor (203) saves the original value (original SP value) of a stack pointer of the binary code (211) in a different register (a3). To put it more specifically, the optimization processor (203) backs up the original SP value in the different register (a3). The different register (a3) is provided in a register of the CPU or in the main memory (103), for example.

In step 605, the optimization processor (203) uses the DU-chain and analyzes all the use positions of the stack pointer. The flowchart of this analysis is separately shown in the subroutine shown in FIG. 6B.

In step 606, the optimization processor (203) propagates offset information (b3) of FIG. 6B to a load instruction corresponding to each store instruction registered in a list (c3) of memory accesses, which is created in FIG. 6B. The flowchart of the propagation is separately shown in the subroutine in FIG. 6C.

In step 607, for the same area found (known) not to be actually aliased, e.g., a register save area (also referred to as a register save area) on the basis of the offset information (b3), each memory access is replaced with a local variable access in the compiler. To put it more specifically, allocation to a local variable is determined on the basis of the local variable information, for each memory access accessing to an area where a register is to be saved on a stack or restored. Then, each memory access is replaced with the corresponding local variable access. The local variable access is determined in accordance with FIG. 8A or FIG. 8B. The post-replacement local variable access is replaced with a register access. The same memory access found (known) not to be actually aliased is a memory access to a stack area in order to save a value of each register.

In the optimization according to the third embodiment of the present invention, from among the memory accesses included in binary code, only memory accesses to the register save area are optimized while memory accesses other than these memory accesses are not optimized.

The optimization according to the third embodiment of the present invention is useful not only in the improvement in the performance of the computer resources but also in analysis of an indirect branch target address.

FIG. 6B shows an embodiment of a subroutine analyze_uses(def, offset) of step 605 of FIG. 6A.

The steps in steps 611 to 627 of FIG. 6B correspond to the steps in steps 431 to 447 of FIG. 4C or the steps in steps 531 to 547 of FIG. 5C respectively. Accordingly, the description of steps 611 to 627 of FIG. 6B is omitted in this description.

FIG. 6C shows an embodiment of a subroutine propagate( ) of step 606 of FIG. 6A.

The steps in steps 631 to 639 of FIG. 6C correspond to the steps in steps 451 to 459 of FIG. 4D or the steps in steps 551 to 559 of FIG. 5D respectively. Accordingly, the description of steps 631 to 639 of FIG. 6C is omitted in this description.

FIG. 7A shows a flowchart of a compiling method for optimizing binary code, which corresponds to a fourth embodiment of the present invention.

FIG. 7A is the same as FIG. 6A except that "deletion of replaced memory access" is performed in step 707 and that steps 708 to 711 are added. To put it more specifically, steps 601 to 606 of FIG. 6A correspond to steps 701 to 706 of FIG. 7A, respectively. Accordingly, only additional (or modified) steps 707 to 711 in FIG. 7A will be described below.

In step 707, for the same area found (known) not to be actually aliased, e.g., a register save area (also referred to as a register save area) on the basis of the offset information (b4), each memory access is replaced with a local variable access in the compiler. To put it more specifically, it is determined based on local variables information which local variable is to be accessed in place of the memory access accessing to an area in order to save or restore a value of each register. Then, each memory access is replaced with the corresponding/determined local variable access. The local variable access is determined in accordance with FIG. 8A or FIG. 8B. The post-replacement local variable access is replaced with a register access. Then, the replaced memory accesses are deleted from the (d4). The reason for deleting the replaced memory accesses is that the memory accesses no longer apply to the escape condition because the memory accesses are replaced with the local variables.

In step 708, the optimization processor (203) performs memory access replacement determination. The flowchart of the replacement determination is separately shown in the subroutine shown in FIG. 7D.

In step 709, the optimization processor (203) replaces a memory access other than the memory accesses stored in a replacement prohibition list (e4) with a local variable access.

In step 710, the optimization processor (203) generates a copy of a local variable at an edge (boundary) of a call number. This processing is performed to unify the values at the edge because there is a case where the local variables are different even though the positions where offsets of memory accesses to the stack access are the same. To put it more specifically, when there are offsets overlapping each other at an edge of a call number (at the entry part of a method or an exist part of a method), a copy of a local variable is generated at the edge. The flowchart for generating the copy is separately shown in a subroutine shown in FIG. 7E. Step 710 can be executed if which local variable is to be accessed in place of the memory access on the basis of a set of the call number and the offset from the stack pointer (also, referred to as "local variable information") shown in FIG. 8B below. If the offset shown in FIG. 8A below is used alone, the same local variable is allocated to the same memory accesses regardless of the call number, so that step 710 does not have to be executed.

In step 711, the optimization processor (203) deletes an instruction to increment or decrement the value of the stack pointer if all the memory accesses using the stack pointer no longer exist after step 706. The instruction to increment or decrement the value of the stack pointer is an addition instruction with the constant C shown in step 724 of FIG. 7B below, for example. Here, step 711 is an optional step and is not necessarily executed in an optimization.

FIG. 7B shows an embodiment of a subroutine analyze_uses(def, offset) of step 705 of FIG. 7A.

The steps in steps 721 to 737 of FIG. 7B correspond to the steps in steps 431 to 437 of FIG. 4C, the steps in steps 531 to 537 of FIG. 5C, or the steps in steps 611 to 627 of FIG. 6B respectively. Accordingly, the description of steps 721 to 737 of FIG. 7B is omitted in this description.

FIG. 7C shows an embodiment of a subroutine propagate( ) of step 706 of FIG. 7A.

The steps in steps 741 to 749 of FIG. 7C correspond to the steps in steps 451 to 459 of FIG. 4D, the steps in steps 551 to 559 of FIG. 5D, or the steps in steps 631 to 639 of FIG. 6C respectively. Accordingly, the description of steps 741 to 749 of FIG. 7C is omitted in this description.

FIG. 7D shows an embodiment of a subroutine analyze_accesses( ) of step 708 of FIG. 7A.

In step 751, a subroutine analyze_accesses( ) starts.

In step 752, the optimization processor (203) repeatedly performs the processing of step 753 for each instruction in the list (d4) of the memory accesses registered in step 736 of FIG. 7B.

In step 753, the optimization processor (203) stores in the replacement prohibition list (e4) the instruction in the (d4). The instructions in the (d4) is an instruction to prohibit replacement of the memory accesses of the stack pointer base included in a call number including the instruction of the stack pointer that has escaped and in a root call number of the call numbers including the instruction with local variable accesses. Alternatively, flags to identify that the replacement of the memory accesses is prohibited can be added to the instruction in the (d4). The memory accesses which are registered in the replacement prohibition list (e4) or to which the aforementioned flags are added are not replaced with local variable accesses in step 709. The root call number can be specified by using the tree structure (903) of FIG. 9A, which shows the parent-child relationship information, for example, and tracing the tree in the upper direction.

Note that, the following variation can be employed in which, when a stack pointer is positioned before an instruction for a stack pointer that has escaped, the stack access included in the call number and the root call number of the call number including the instruction is replaced with a register but the latest value is stored in the memory.

In step 754, the optimization processor (203) returns to step 752 in order to repeat step 753 for all the individual escape instructions in the (d4).

Step 755 corresponds to the end of the subroutine analyze_accesses( ).

FIG. 7E shows an embodiment of a subroutine generate_copy( ) of step 710 of FIG. 7A.

In step 761, a subroutine generate_copy( ) starts.

Steps 762 to 766 correspond to the loop processing for the entry part (also, referred to as "entry code") of an inlined method. Steps 767 to 770 correspond to the loop processing for the exit part (also, referred to as "exit code") of the inlined method.

In step 762, the optimization processor (203) executes steps 763 to 765 by inserting a call number for the inlining in an id (variable) for the entry part of each inlined method. The id is used with the offset information in order to find a local variable for which a copy of the variable needs to be generated.

In step 763, for the memory access MA1 corresponding to the id, the optimization processor (203) searches for a memory access MA2 which corresponds to the root of the id and which has the same offset at the outer side and the inner side of the boundary (i.e., offsets overlap each other). To put it more specifically, the optimization processor (203) searches for a memory access corresponding to the root of the id and having the same offset and then sets the memory access that is found first to be the MA2.

In step 764, if the memory access MA2, which has the same offset, does not exist (i.e., offsets do not overlap each other), the processing proceeds to step 765. Meanwhile, if there is the memory access MA2, which has the same offset (i.e., offsets overlap each other), the processing proceeds to step 766.

In step 765, the optimization processor (203) returns to step 762 in order to repeat the processing of steps 763 and 764 for all the ids. After the processing of steps 763 and 764 are repeated for all the call numbers for the inlining, the processing proceeds to step 767.

In step 766, the optimization processor (203) generates a copy of a local variable corresponding to the MA2 in place of a local variable corresponding to the MA1 at the entry part of the aforementioned inlined method. To put it more specifically, the optimization processor (203) generates a copy from the root side. After generating a copy to the local variable, the processing proceeds to step 765.

In step 767, the optimization processor (203) executes steps 768 to 770 by inserting the call number for the inlining in the id (variable) for the exit part (also, referred to as "exit code") of each inlined method.

In step 768, for a memory access MA3 corresponding to a parent call number of the id (hereinafter, referred to as a "parent"), the optimization processor (203) searches for a memory access MA4 which corresponds to an id or a child of the id and has the same offset (i.e., offsets overlap each other). To put it more specifically, the optimization processor (203) conducts a search to find a child of the id having the same offset and then sets the memory access found first to be the MA4.

In step 769, if the memory access MA4, which has the same offset, does not exist (i.e., offsets do not overlap each other), the processing proceeds to step 770. Meanwhile, if there is the memory access MA4, which has the same offset, exists (i.e., offsets overlap each other), the processing proceeds to step 771.

In step 770, the optimization processor (203) returns to step 767 to in order to repeat the processing of steps 768 and 769 for all the ids. After the processing of steps 768 and 769 are repeated for all the ids, the processing proceeds to step 772.

In step 771, the optimization processor (203) generates a copy of a local variable corresponding to the MA2 in place of a local variable corresponding to the MA1 at the entry part of the aforementioned inlined method. To put it more specifically, the optimization processor (203) generates a copy from the child side. After generating a copy to the local variable, the processing proceeds to step 770.

Step 772 corresponds to the end of the subroutine generate_copy( ).

Figure 8A:
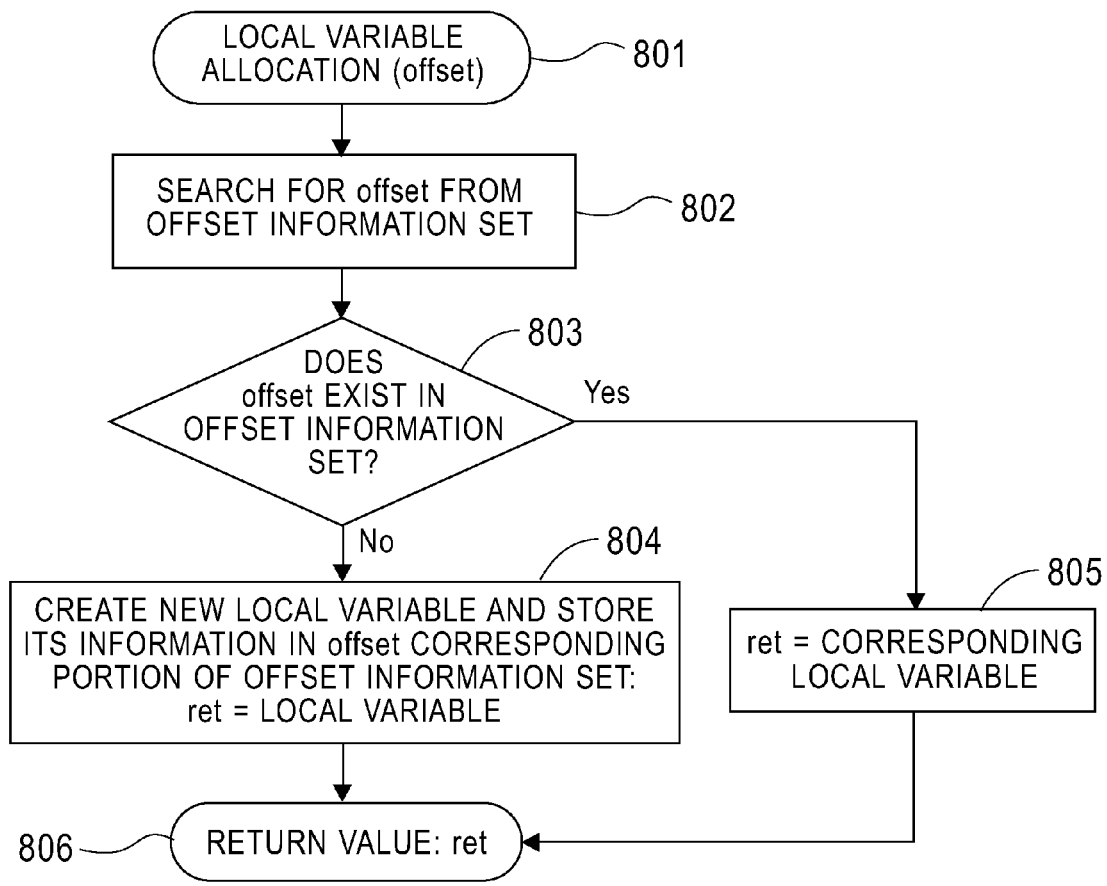
FIG. 8A shows a flowchart of local variable allocation in the first to fourth embodiments of the present invention.

FIG. 8A shows a flowchart of local variable allocation in the first to fourth embodiments of the present invention.

In the flowchart, which local variable is to be accessed in place of the memory access to the stack is determined on the basis of the offset from the stack pointer alone.

In step 801, the local variable allocation is started.

In step 802, the optimization processor (203) searches for the offset which is the argument of step 801 from the offset information set (b1, b2, b3, b4). Examples of the offset information set include the b1 (420) of FIGS. 4B and 4C, the b2 (520) of FIGS. 5B and 5C, the b3 (620) of FIG. 6B and the b4 (730) of FIG. 7B.

In step 803, the optimization processor (203) checks if the aforementioned offset exists in the aforementioned offset information set or not. If the aforementioned offset does not exist, the processing proceeds to step 804. Meanwhile, if the aforementioned offset exists, the processing proceeds to step 805.

In step 804, the optimization processor (203) creates a new local variable and stores its information in the offset correspondence portion of the offset information set. The optimization processor (203) acquires as a return value (ret) the newly created local variable.

In step 805, the optimization processor (203) acquires the corresponding local variable as a return value (ret). Here, the term "corresponding" refers to the information stored in the local variable in the element of the offset information.

In step 806, the optimization processor (203) allocates the return value (ret) from step 804 or step 805 as the local variable.

Figure 8B:
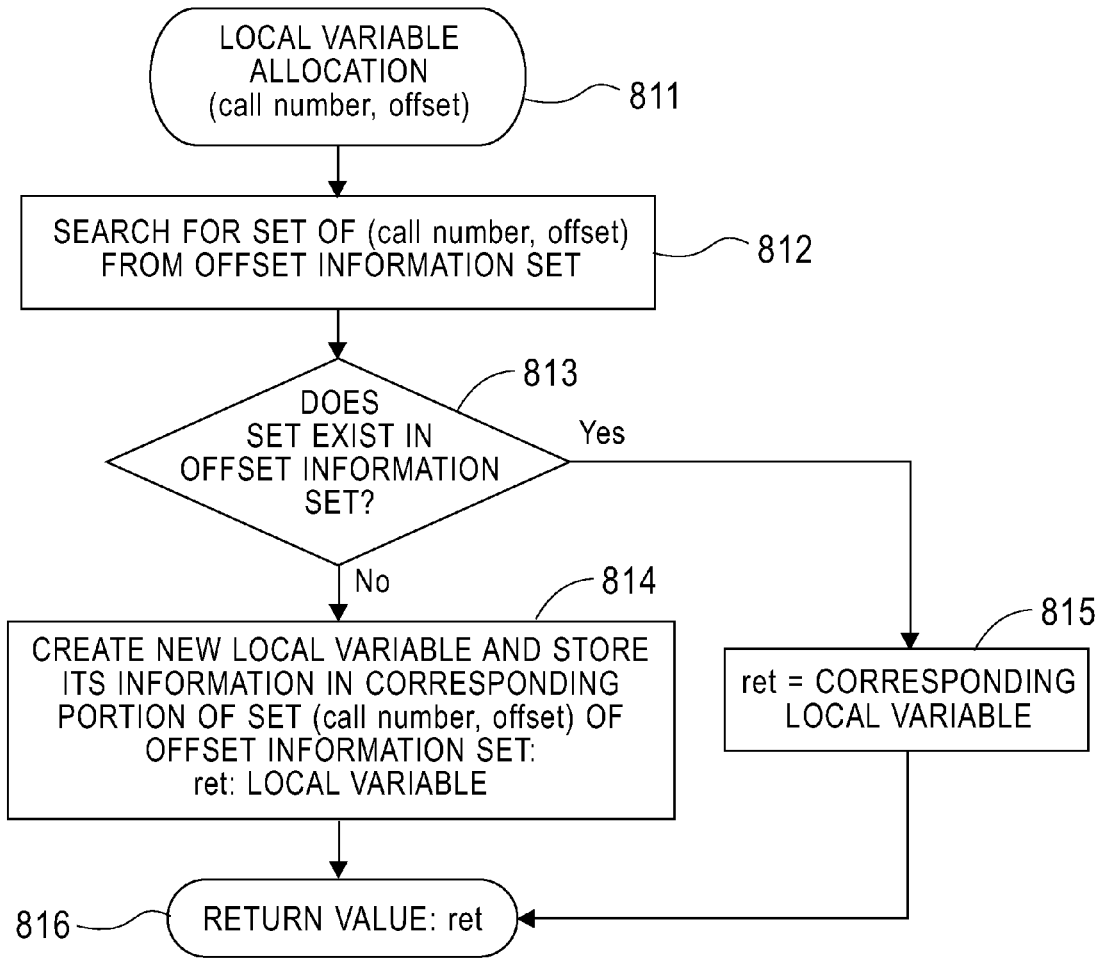
FIG. 8B shows a flowchart of local variable allocation in the third embodiment of the present invention (FIGS. 6A to 6C) and the fourth embodiment of the present invention (FIGS. 7A to 7E).

FIG. 8B shows a flowchart of local variable allocation in the third embodiment of the present invention (FIGS. 6A to 6C) and the fourth embodiment of the present invention (FIGS. 7A to 7E).

In the flowchart, allocation to a local variable is determined for each memory access to the stack on the basis of a set of the call number and the offset from the stack pointer (also referred to as "local variable information").

In step 811, the local variable allocation is started.

In step 812, the optimization processor (203) searches for the set of the call number and the offset from the offset information set (local variable information).

In step 813, the optimization processor (203) checks if the aforementioned set (local variable information) exists in the aforementioned searched set. If the aforementioned set (local variable information) does not exist, the processing proceeds to step 814. Meanwhile, if the aforementioned set (local variable information) exists, the processing proceeds to step 815.

In step 814, the optimization processor (203) creates a new local variable and stores its information in the corresponding portion of the set of the call number and the offset (local variable information) in the offset information set. Then, the optimization processor (203) acquires as a return value (ret) the newly created local variable.

In step 815, the optimization processor (203) acquires the corresponding local variable as a return value (ret).

In step 816, the optimization processor (203) allocates the return value (ret) from step 814 or step 815 as the local variable.

The allocation of a local variable in FIG. 8B is different from the allocation of a local variable in FIG. 8A in that the call number is used in addition to the offset from the stack pointer. The allocation shown in FIG. 8B has an advantage in the optimization as compared with the allocation shown in FIG. 8A because of the following reasons. In the allocation shown in FIG. 8A, when the offset is the same, the same local variable is allocated regardless of the call number. Meanwhile, in the allocation shown in FIG. 8B, even when the offset is the same, a different local variable is allocated if the call number changes. In the embodiments of the present invention, whether a stack pointer register has escaped or not affects the optimization related to the escape. Accordingly, when call numbers are different, the execution speed (performance) becomes better if different local variables are allocated to the memory accesses of the call numbers. Let us suppose that variables A and B are allocated to the memory accesses having the same offset because the call numbers are different in the processing of FIG. 8B, for example. Then, let us suppose that there are 10 memory accesses associated with the variable A and 20 memory accesses associated with the variable B. If the variable A has escaped, the number of memory accesses to be affected is 10. To put it more specifically, the number of memory accesses to be affected is the same as the number of memory accesses associated with the variable A. Meanwhile, the variable A and the variable B are integrated in the processing shown in FIG. 8A and thus become a variable C. Thus, the number of memory accesses associated with the variable C is 30 in this case. To put it more specifically, the number of memory accesses is equal to the total number of the memory accesses associated with the variable A and the memory accesses associated with the variable B before the variables are integrated. Accordingly, if the variable C has escaped, the number of memory accesses to be affected is 30. Thus, use of the allocation shown in FIG. 8B is more convenient than the allocation shown in FIG. 8A for the optimization to be performed after the allocation.

Figure 9A:
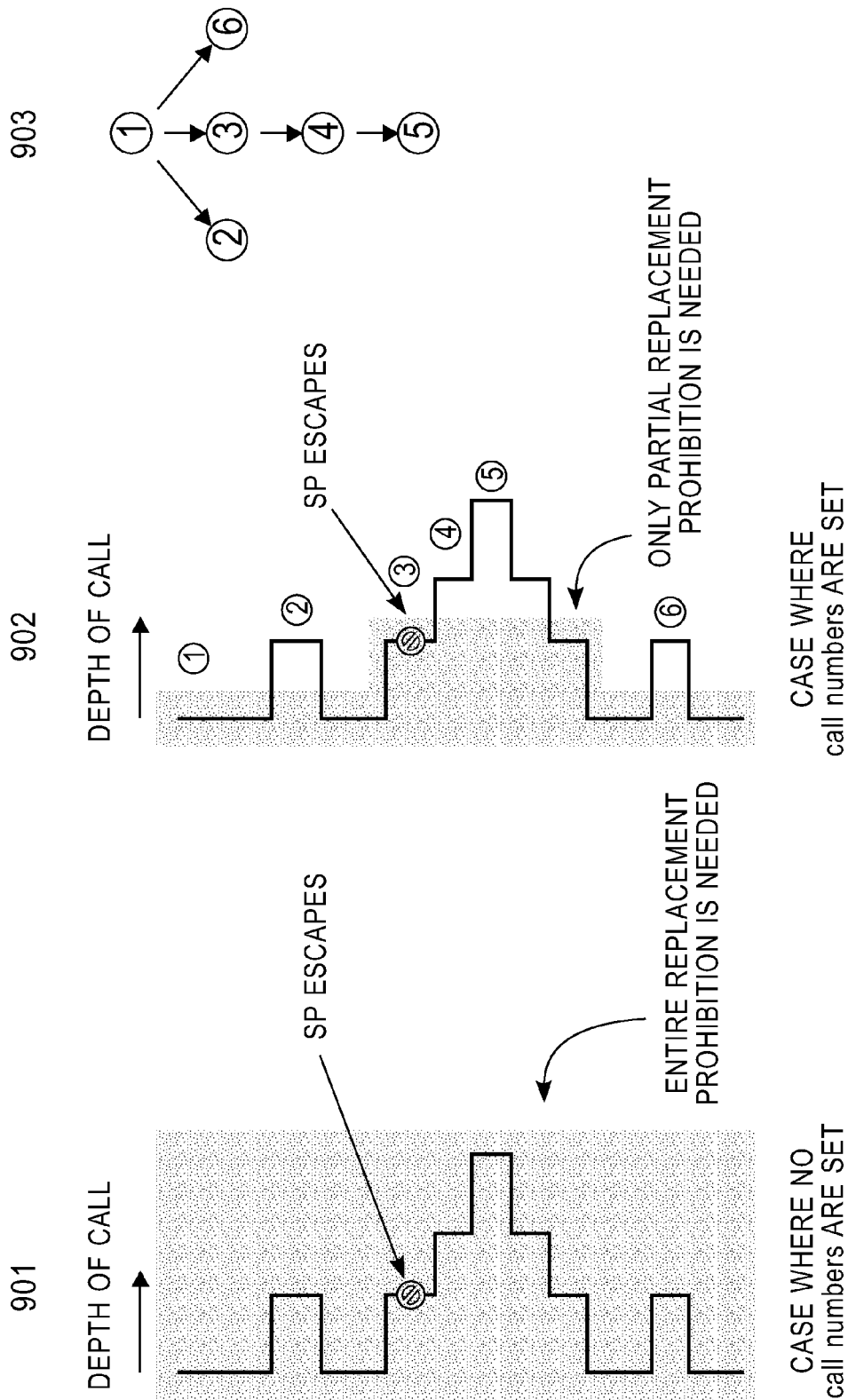
FIG. 9A shows a difference in prohibition of replacement with a local variable access between a case where no call number is set (901) and a case where call numbers are set (902).

FIG. 9A shows a difference in prohibition of replacement with a local variable access between a case where no call number is set (901) and a case where call numbers are set (902).

Figure 9B:
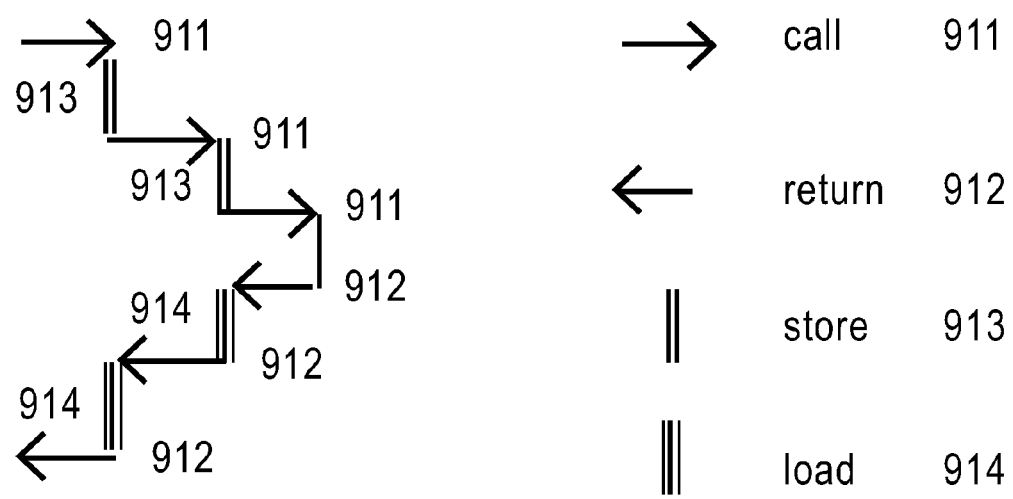
FIG. 9B shows a situation where code is inlined in a nested manner.

In FIG. 9A, the relationship between a call instruction, a return instruction, a store instruction and a load instruction with each line is not described, but the relationship is the same as the example illustrated in FIG. 9B. Thus, a description will be first given of FIG. 9B.

FIG. 9B illustrates an example of a state where code to be called by a call instruction included in binary code is inlined in a nested manner.

The nested inlined code can include an if statement or a loop statement, for example.

A call instruction (911) is shown by an arrow from left to right. The arrow corresponds to the depth of the call. The depth of the call becomes deeper by the call instruction (911). A store instruction (913) is executed subsequently to the call instruction (911).

A return instruction (912) is shown by an arrow from right to left. The arrow corresponds to the depth of the call. The depth of the call becomes shallower by the return instruction (912). A load instruction (914) is executed subsequently to the return instruction (912).

The store instruction is represented by lines (double lines) in a vertical direction.

The load instruction is represented by lines (triple lines) in a vertical direction.

The description is further given returning to FIG. 9A.

The case where no call numbers are set (901) corresponds to the first embodiment (FIGS. 4A to 4D) of the present invention as well as the second embodiment (FIGS. 5A to 5D) of the present invention.

The case where call numbers are set (902) corresponds to the third embodiment (FIGS. 6A to 6C) of the present invention as well as the fourth embodiment (FIGS. 7A to 7E) of the present invention.

In the case where no call numbers are set (901), when the stack pointer escapes at the point shown in the case 901, the prohibition of replacement with a local variable access becomes effective for the whole memory accesses (filled-in portion) except for the register save area among the memory accesses included in the binary code.

In the case where call numbers are set (902), a graph (903) showing the parent-child relationship information of the call numbers is created for the purpose of taking the parent-child relationship information of the call numbers into consideration. In 902, the call numbers are respectively provided with encircled numbers (1 to 6). The tree graph (903) is a graph showing the parent-child relationship information of the call numbers (1 to 6) shown in 902. If the stack pointer escapes at the point shown in 902, the prohibition of replacement with a local variable access is effective only for the memory accesses included in the call numbers 1 and 3, and not effective for the other memory accesses, which are the memory accesses included in the call numbers 2 and 4 to 6. Thus, the replacement with a local variable access can be prohibited only partially (filled-in portion) instead of entirely. Accordingly, since the replacement with a local variable access can be prohibited only partially (filled-in portion) if call numbers are set, this case is advantageous than the case where no call numbers are set in that the optimization is performed for the other portion.

This case is useful not only for improving the performance but also for analyzing an indirect branch target address because of the optimization.

FIG. 10 shows conversion target binary code, and code generated after an optimization of an embodiment of the present invention is applied to the binary code.

Binary code (1001) is a conversion target code. The numbers 01 to 29 are numbers added for the purpose of description.

Two store multiple instructions (STM) (01, 07) are instructions each storing a register in a register save area.

(SP off) (01, 07) represents a relative offset from the original SP value.

Two load memory instructions (LM) (25, 28) are instructions each loading the value in the register save area to the register.

The statement that R15 escapes is written in each of the store multiple instructions STM (01, 07). This statement indicates that the stack pointer escapes at this point but R15 does not escape because the store goes away due to an optimization in the future.

In addition, the statement that R15 is loaded is written in each of the load memory instructions LM (25, 28). This statement indicates that the value of SP off changes (such as −192=>−96) because the stack pointer is loaded. This means that a change is made because of the offset propagation shown in FIG. 7C.

The optimization in accordance with the first embodiment of the present invention is applied to the binary code (1001). Optimized code (1002) is created as a result of the optimization. The numbers from 101 to 139 are added for the purpose of description. The italic letters show the code changed by the optimization.

The assignments to L1 to L4 (101, 102, 103 and 104) are the results of conversion from the STM (01), which appears first.

The assignments to L5 to L8 (109, 110, 111 and 112) are the results of conversion from the STM (07), which appears subsequently to the aforementioned STM (01).

R4=L7 (128) is the result of conversion from L R4, 0x98 (R0, R15) (24), which appears first.

R12=L5 to R15=L8 (129, 130, 131 and 132) are the results of conversion from LM (25), which appears first.

R4=L3 (134) is the result of conversion from L R4, 0x98 (R0, R15) (27), which appears subsequently to the aforementioned L R4, 0x98(R0, R15) (24).

R12=L15 to R15=L4 (135, 136, 137 and 138) are the results of conversion from LM (28), which appears subsequently to the aforementioned LM (25).

In addition, if the optimization in accordance with each of the second to fourth embodiments of the present invention is applied to the code shown by the binary code (1001), the optimized code of each of the second to fourth embodiments is the same as the optimized code (1002), which can be acquired when the optimization in accordance with the first embodiment of the present invention is applied.

Example

A prototype of the optimization method according to the first embodiment of the present invention is implemented in a Just-In-Time (JIT) compiler. The optimized binary code (1002) has shown almost twice the performance improvement in the execution speed compared with the execution speed of the binary code (1001) before the optimization in the same hardware configuration.

In addition, if the optimization method in accordance with each of the second to fourth embodiments of the present invention is implemented in the JIT compiler, the same result as that of the optimization method in accordance with the first embodiment of the present invention is obtained.

What is claimed is:

1. A compiling method for optimizing binary code, comprising the steps of:
    giving, for inlined code included in the binary code, a corresponding call number to each of the call instructions for the inlining code and the inlined code;
    creating a parent-child relationship information for each call number given to each of the call instructions, wherein said parent-child relationship information designates a caller's call number from the corresponding call instruction as a parent and a callee's call number from the corresponding call instruction as a child;
    for each use of a stack pointer in the binary code to perform a corresponding memory access, if the use of the stack pointer is an escape condition, registering the corresponding memory access in a registered escape list;
    replacing unprohibited memory accesses with corresponding local variable accesses, wherein the unprohibited memory accesses are accesses to a memory area known not to be aliased, wherein said local variable accesses are determined based on a corresponding offset stack pointer;
    subsequent to said registering, deleting said replaced unprohibited memory accesses from the registered escape list;
    subsequent to said deleting, for each instruction remaining in the registered escape list, prohibiting a replacement of a prohibited memory access by storing, on a replacement prohibition list, a call number of an instruction causing escape and a root call number from a call number having said local variable access; and
    replacing each memory access that is not stored in the replacement prohibition list with a corresponding local variable access;
    wherein the steps are carried out using a computer device.

2. The method according to claim 1, further comprising the steps of:
    finding a first register, wherein said first register serves as said stack pointer in said binary code;
    saving said stack pointer in a second register;
    finding each of said memory accesses that correspond to use of said stack pointer by using said first register as a base register in said binary code and then calculating an offset from a value of said second register for a found memory access;
    creating a local variable number, wherein said local variable number identifies a local variable for one of said memory accesses on the basis of a set of said call number and an offset from said value of said second register;
    determining, on the basis of said local variable number, which said local variable is to be accessed in place of said memory accesses in order to save said value of each of said first and second registers; and
    replacing said one of said memory accesses with an access of the said local variable.

3. The method according to claim 1, wherein said stack pointer escapes if (i) a value of said stack pointer is written in a memory, (ii) a call instruction that is not inlined exists, or (iii) an instruction that can cause an exception exists.

4. The method according to claim 2, further comprising of the step of:
    generating a copy of said local variable at each of an entry part and an exit part of an inlined method for a corresponding one of said call instructions included in said binary code if one of said memory accesses has the same offset as a memory access at an inner side of the entry part or the exit part exists at an outer side.

5. The method according to claim 1 further comprising the step of:
    deleting an instruction to increment or decrement a value of said stack pointer if said stack pointer has not escaped and all of said memory accesses using said stack pointer no longer exist.

6. The method according to claim 1, further comprising the step of:
    replacing said memory access using an unescaped stack pointer with said local variable access if a stack pointer has not escaped.

7. The method according to claim 1, further comprising the steps of:
    finding a first register, wherein said first register serves as said stack pointer in said binary code;
    saving said stack pointer in a second register;
    finding each of said memory accesses that correspond to use of said stack pointer by using said first register as a base register in said binary code and then calculating an offset from a value of said second register for a found memory access;
    acquiring a set of at least one of said memory accesses having the same said offset from calculated offsets; and
    determining whether a stack area to be accessed by said set is an area not to be aliased,
    wherein said determining step determines whether said stack area is in an offset area of one of said memory accesses on said stack area in order to save a value of a register.

8. The method according to claim 6, wherein said stack pointer escapes if (i) a value of the stack pointer is written in a memory, (ii) a call instruction that is not inlined exists, and (iii) an instruction that can cause an exception exists.

9. The method according to claim 8, wherein said step of replacing one of said memory accesses using an unescaped stack pointer further comprises the steps of:
   storing an escaping stack pointer on a list; and
   determining whether said stack pointer has not escaped by finding if said list is an empty set.

10. A system for optimizing binary code, the system comprising:
   a computer, comprising a processor and a memory, which executes each of a plurality of modules, the plurality of modules comprising:
   a first module for giving, for inlined code included in a binary code, a corresponding call number to each of the call instructions for the inlining code and the inlined code;
   a second module for creating a parent-child relationship information for each call number given to each of the call instructions, wherein said parent-child relationship information designates a caller's call number from the corresponding call instruction as a parent and a callee's call number from the corresponding call instruction as a child;
   a third module for registering a memory access in a registered escape list if the use of the stack pointer is an escape condition, where said third module performs said registration for each use of a stack pointer in the binary code to perform a corresponding memory access;
   a fourth module for replacing unprohibited memory accesses with corresponding local variable accesses, wherein the unprohibited memory accesses are known not to be aliased, wherein said local variable accesses are determined based on a corresponding offset stack pointer;
   a fifth module for deleting said replaced unprohibited memory accesses from the registered escape list, where said fifth module performs said deletion subsequent to said registering;
   a sixth module for prohibiting, subsequent to said deleting, a replacement of a prohibited memory accesses by storing, on a replacement prohibition list, a call number of an instruction causing escape and a root call number from a call number having said local variable access, where said sixth module performs said storing for each instruction remaining in the registered escape list; and
   a seventh module for replacing each memory access that is not stored in the replacement prohibition list with a corresponding local variable access.

11. The system according to claim 10, wherein said first plurality of modules further comprises:
   an first module for finding a first register, wherein said first register serves as said stack pointer in said binary code;
   a second module for saving said stack pointer in a second register;
   a third module for finding each of said memory accesses that correspond to use of said stack pointer by using said first register as a base register in said binary code and then calculating an offset from a value of said second register for a found memory access;
   an fourth module for creating a local variable number, wherein said local variable number identifies a local variable for one of said memory accesses on the basis of a set of said call number and an offset from said value of said second register;
   a fifth module for determining, on the basis of said local variable number, which said local variable is to be accessed in place of said one of said memory accesses in order to save said value of each of said first and second registers; and
   a sixth module for replacing said one of said memory accesses with an access of an allocated local variable.

12. The system according to claim 11, wherein said call number creates a parent-child relationship information for at least one of said call number, wherein said parent-child relationship designates a caller's call number from said call instruction as a parent and a callee's call number from said call instruction as a child.

13. The system according to claim 10, wherein said stack pointer escapes if (i) a value of said stack pointer is written in a memory, (ii) a call instruction that is not inlined exists, or (iii) an instruction that can cause an exception exists.

14. The system according to claim 11, further comprising a seventh module for generating a copy of said local variable at each of an entry part and an exit part of an inlined method for a corresponding one of said call instructions included in said binary code if (i) one of said memory access has the same offset as a memory access at an inner side of the entry part or the exit part exists at an outer side, and (ii) said local variable corresponds to said memory access at said outer side.

15. The system according to claim 10, further comprising a eighth module for deleting an instruction to increment or decrement a value of said stack pointer if said stack pointer has not escaped and all of said memory accesses using said stack pointer no longer exist.

16. The system according to claim 10, further comprising a ninth module for replacing one of said memory accesses using an unescaped stack pointer with one of said local variable accesses if a stack pointer has not escaped.

17. The system according to claim 10, wherein said plurality of modules further comprises:
   a tenth module for finding a first register, wherein said first register serves as said stack pointer in said binary code
   an eleventh module for saving said stack pointer in a second register;
   a twelfth module for finding finds each of said memory accesses that correspond to use of said stack pointer by using said first register as a base register in said binary code and then calculating an offset from a value of said second register for a found memory access;
   a thirteenth module for acquiring a set of at least one of said memory access having the same said offset from calculated offsets; and
   a fourteenth module for determining whether said stack area to be accessed by said set is an area not to be aliased.

18. A non-transitory computer readable storage medium tangibly embodying a computer readable program code having computer readable instructions which when implemented, cause a computer to carry out the steps of claim 1.

* * * * *